(12) United States Patent
Zhao

(10) Patent No.: US 7,584,737 B2
(45) Date of Patent: Sep. 8, 2009

(54) POWER TRANSMISSION MECHANISM FOR CONVERSION BETWEEN LINEAR MOVEMENT AND ROTARY MOTION

(75) Inventor: Qum Zhao, Xiamen (CN)

(73) Assignee: Xiamen Tuxian Energetic Science & Technology Co., Ltd., Xiamen (CN)

( * ) Notice: Subject to any disclaimer, the term of this patent is extended or adjusted under 35 U.S.C. 154(b) by 117 days.

(21) Appl. No.: 11/791,412

(22) PCT Filed: Nov. 24, 2005

(86) PCT No.: PCT/CN2005/001986

§ 371 (c)(1),
(2), (4) Date: May 23, 2007

(87) PCT Pub. No.: WO2006/056126

PCT Pub. Date: Jun. 1, 2006

(65) Prior Publication Data

US 2007/0295300 A1    Dec. 27, 2007

(30) Foreign Application Priority Data

Nov. 24, 2004 (CN) .................... 2004 1 0084519

(51) Int. Cl.
*F02B 75/18* (2006.01)
(52) U.S. Cl. .................... 123/197.1; 123/56.3
(58) Field of Classification Search ........... 123/197.1, 123/56.2, 56.3, 56.5, 56.6
See application file for complete search history.

(56) References Cited

U.S. PATENT DOCUMENTS

| | | | | |
|---|---|---|---|---|
| 2,274,097 A | * | 2/1942 | Sheerer | 123/56.7 |
| 5,335,634 A | | 8/1994 | Hashimoto et al. | |
| 5,566,578 A | * | 10/1996 | Rose | 74/57 |
| 6,250,264 B1 | * | 6/2001 | Henriksen | 123/56.2 |
| 6,349,694 B1 | | 2/2002 | Babington | |
| 6,988,470 B2 | * | 1/2006 | Brueckmueller | 123/56.3 |

(Continued)

FOREIGN PATENT DOCUMENTS

CN    1081231    1/1994

(Continued)

*Primary Examiner*—Hai H Huynh
(74) *Attorney, Agent, or Firm*—Scully, Scott, Murphy & Presser, P.C.

(57) ABSTRACT

The present invention relates to a spatial cam power transmitting mechanism for the conversion between linear movement and rotary motion. Several transmitting mechanisms for the conversion between reciprocating motion of a roller shaft and rotary motion of an internal groove cam are provided, which do not have a piston and a piston bore. A roller shaft 16 is provided on a upper portion of internal groove cam 6 in a cam casing 15, and rollers are mounted to the outer end of the roller shaft. The rollers roll in a circumferential direction on the contour line of the groove of the internal groove cam 6. At the position of fixed rails 4 opposing to the roller shaft 16, guiding rollers or slide blocks 27 are provided, wherein the fixed rails 4 are provided axially in a lower portion of a cover 1 of the cam casing. The guiding rollers or slide blocks 27 can move up and down respectively in the fixed rails. The power transmitting mechanism is used in an internal combustion engines burning petrol, diesel oil or gas, a stirling engine, a motive engine, such as air or liquid motor, a pump transmitting gas and liquid, a compressor, or other fields which need movement translation.

20 Claims, 17 Drawing Sheets

U.S. PATENT DOCUMENTS

| | | | |
|---|---|---|---|
| 7,137,365 B2 * | 11/2006 | Maslen | 123/54.1 |
| 7,360,521 B2 * | 4/2008 | Raether | 123/197.1 |

FOREIGN PATENT DOCUMENTS

| | | |
|---|---|---|
| CN | 1082141 | 2/1994 |
| CN | 1096851 A | 12/1994 |
| DE | 19603119 | 8/1996 |
| FR | 2481363 | 4/1981 |
| JP | 5-010148 | 1/1993 |

* cited by examiner

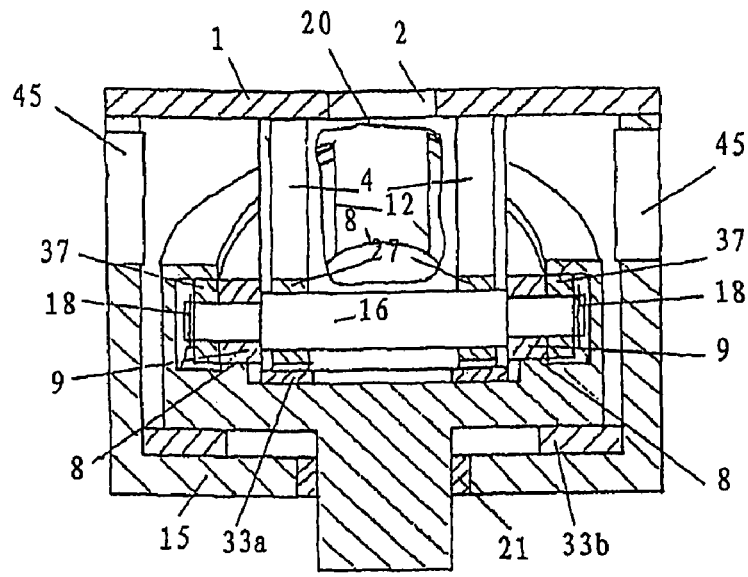
FIG. 1
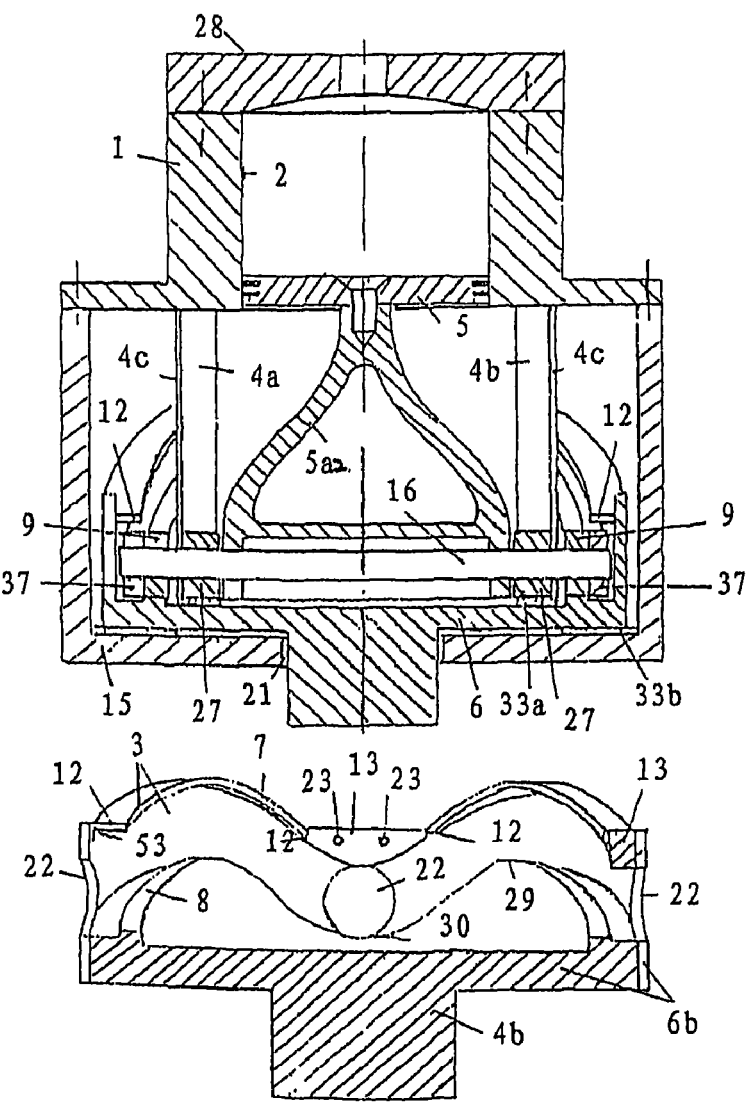
FIG. 1a
FIG. 2a

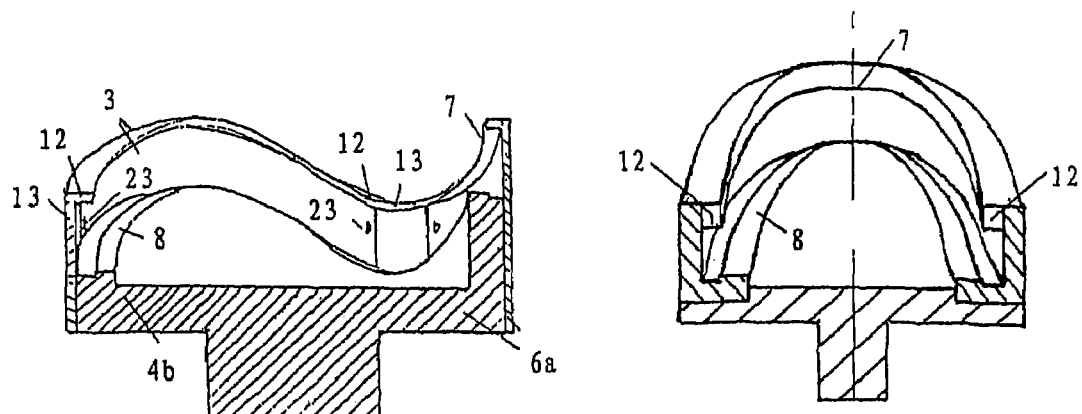
FIG. 2b
FIG. 2c
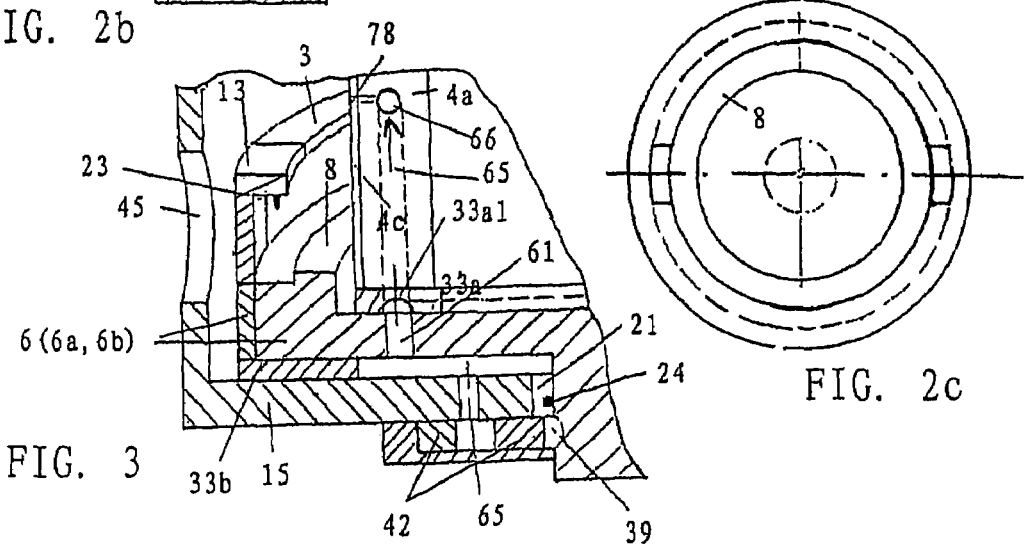
FIG. 3
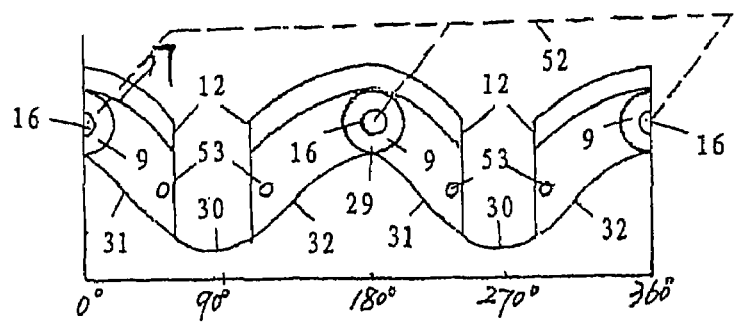
FIG. 4a
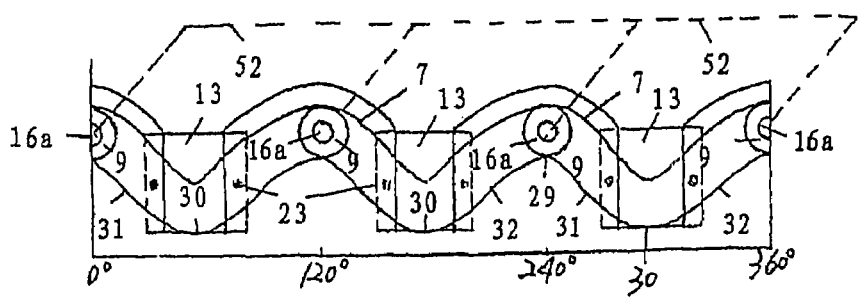
FIG. 4b

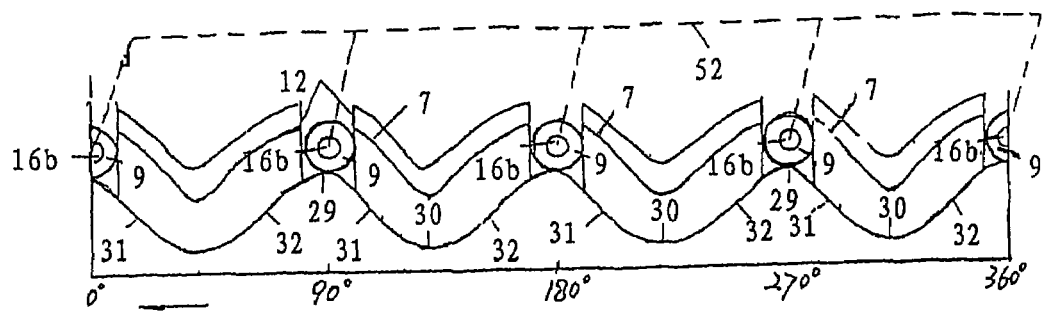
FIG. 4c
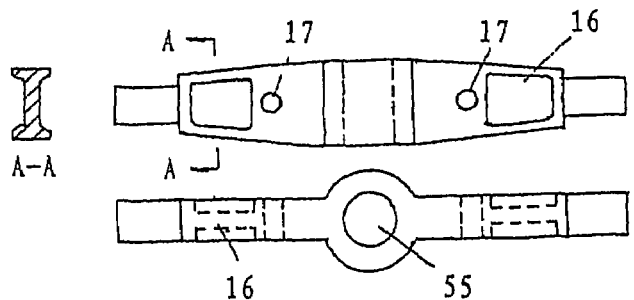
FIG. 5a
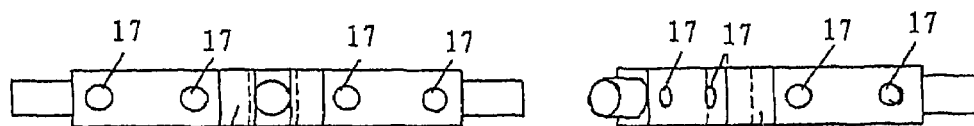
FIG. 5c1
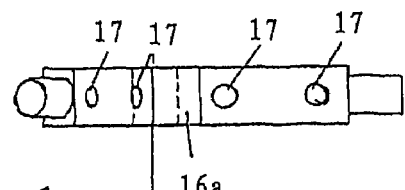
FIG. 5b1
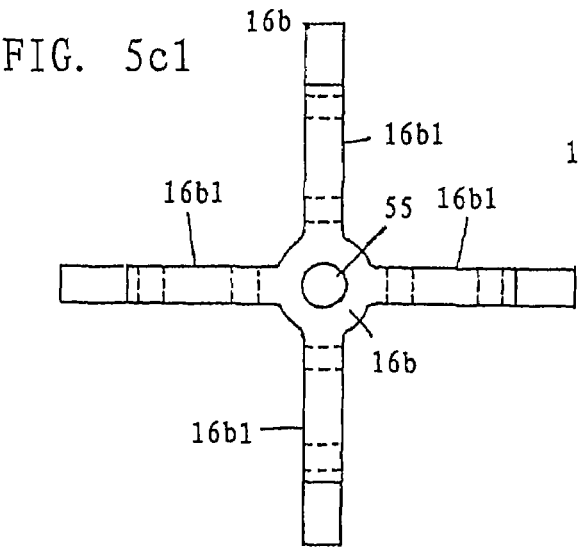
FIG. 5c2
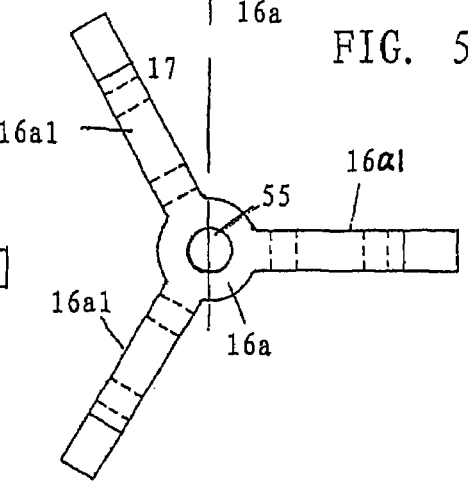
FIG. 5b2

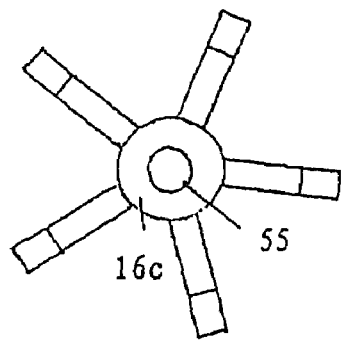
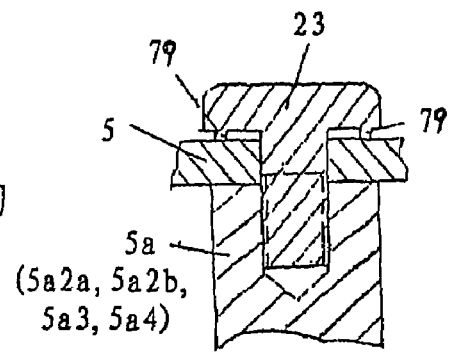
FIG. 5d          FIG. 6
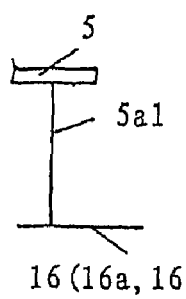
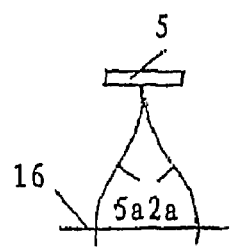
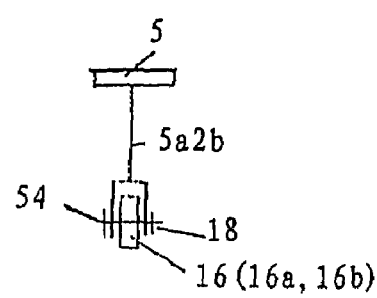
FIG. 6a     FIG. 6b1     FIG. 6b2
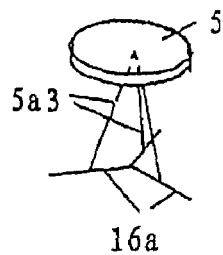
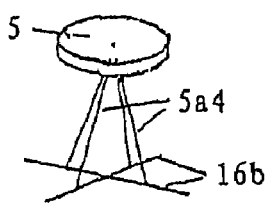
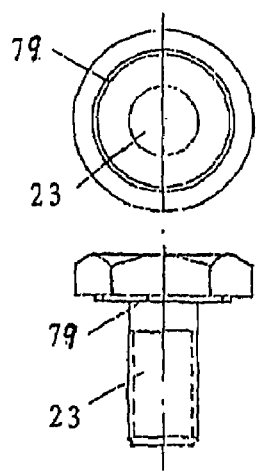
FIG. 6c     FIG. 6d
FIG. 6e

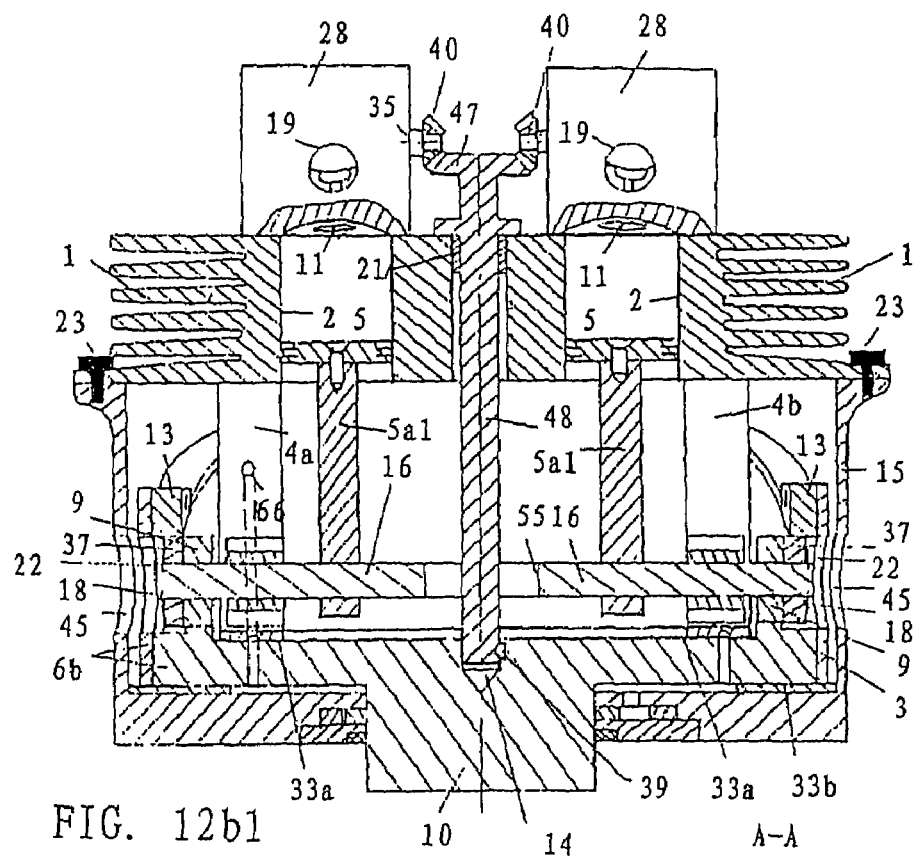
FIG. 12b1
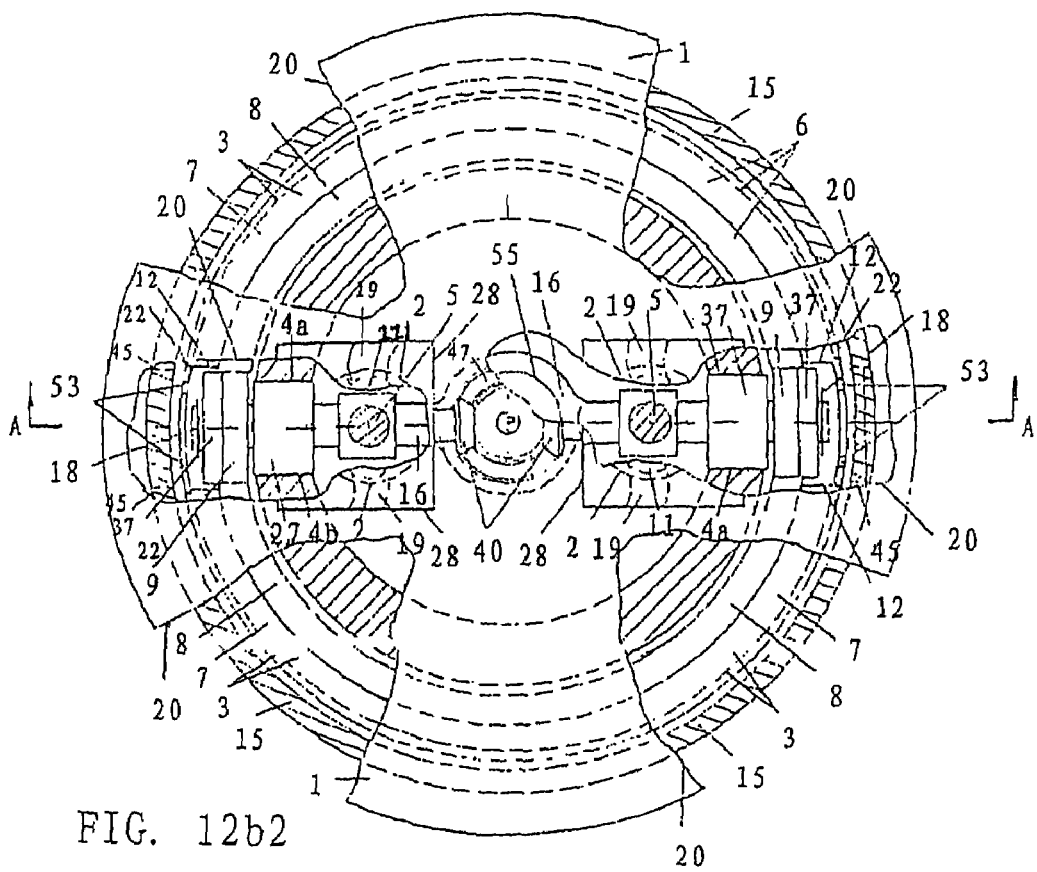
FIG. 12b2

POWER TRANSMISSION MECHANISM FOR CONVERSION BETWEEN LINEAR MOVEMENT AND ROTARY MOTION

TECHNICAL FIELD OF THE INVENTION

The present invention relates to a transmission mechanism for conversion between linear movements and rotary motions, more particularly, to a transmission mechanism for conversion between the reciprocating motion of a roller shaft and the rotary motion of an internal groove cam, furthermore particularly, to a power transmission mechanism for conversion between the reciprocating motion of a piston and a rotary motion of an internal groove cam.

BACKGROUND OF THE ART

Chinese Patent Application No. 94100421.x, entitled "Internal Combustion Engine having Cam Piston" and published on Dec. 28, 1994, discloses a pin shaft (roller shaft) comprising a suspension beam having a free end received in an internal groove of a cam, which must be provided with a piston in order to balance the other end of the beam, as shown in FIGS. 1, 4 and 5. Therefore, the piston exerts a lateral force to the cylinder, which deteriorates the service life of the piston and the cylinder. Since the projection image of the upper circumferential cam contour completely overlaps with that of the lower circumferential cam contour, the roller generates inverse torque when the pin shaft bearing impacts from one side to the other side across the groove of the circumferential cam contour, resulting serious wearing at the cross point. In addition, it is extremely inconvenient to replace the rollers and to design a single-cylinder internal combustion engine and a multi-cylinder internal combustion engine by simply combining cylinders.

SUMMARY OF THE INVENTION

The objective of the present invention is to provide several kinds of transmission mechanisms, in each of which a roller shaft is provided with rollers near outer ends thereof received in a circumferential groove of an internal groove cam, so as to make it possible to form a non-cantilevered structure freely supported at least at two ends in order to achieve the conversion between parallel reciprocating motion of the roller shaft and rotary motions of the internal groove cam while pistons (vertical motion rods) and cylinders (guiding holes) are not provided. Accordingly, when cylinders and pitons are provided, there is no lateral force applied to the cylinder walls. It is also convenient to install the roller shaft in the mechanism for power transmission, while rotary direction of the rollers in the cam groove near respective outer ends keeps unchanged, which is adapted to be used in the field of internal combustion engines, compressors, pumps and pneumatics where motion conversion is needed.

Power transmission mechanism for conversion between linear movements and rotary motions of the present invention includes a pure rotary motion member comprising an internal groove cam, reciprocating members include a roller shaft, guiding rollers or sliding blocks 27, primary rollers 9 and secondary rollers 37, supports including a cam support (cam box) 15, a cover (cylinder) 1, fixed guiding rails 4. The cam box 15 is provided with an internal groove cam therein, and a cover 1 fixed at the upper part of the cam box 15 for closing. The cam box 15 further includes a roller shaft on which a primary roller 9 and a secondary roller 37 are mounted near each end. The rollers roll on the inner circumferential cam contour of the groove so that the roller shaft becomes a non-cantilevered balanced structure freely supported at least at two ends. Guiding rollers or slide blocks 27 are further disposed on the roller shaft at corresponding positions to the fixed guide rails 4 connected the lower end of the cover 1 along the axial direction of the internal groove cam so as to roll or slide up and down along the fixed guide rails 4 as shown in FIG. 1.

The roller shaft may be coupled with a piston rod (vertical motion rod) 2a, or the piston rod (vertical motion rods) 2a may be connected with a short piston at its upper end which moves up and down through the guiding holes (cylinder opening) 2 in the cover (cylinder) 1. Further, a cylinder cover 28 is provided on the cylinder 1 so as to form a chamber with cylinder opening 2 being sealed, as shown in FIG. 1a.

One end of the internal groove cam of the present invention is a support end, and the other end thereof has a cylindrical cavity which has on its inner circumferential wall a continuous groove having at least two peaks and two valleys with same amplitude. Further, the upper circumferential cam contour 7 has at least two slots 12 to facilitate installment of the roller shaft with rollers being received into the groove of the internal groove cam, as shown in FIGS. 2a, 2b and 2c.

The lower end of the internal groove cam of the present invention is an output support end which is fixed on a flange connecting with an output shaft, and the upper end thereof has an end surface having at least two peaks and two valleys. A continuous groove having the same at least two peaks and two valleys as those of the upper end is provided along the circumference of the cavity. Further, the upper circumferential cam contour 7 has at least two slots 12 to facilitate installment of the roller shaft with the rollers being received into the groove of the internal groove cam, as shown in FIG. 2c.

The above described internal groove cam may be formed by a combination of an end surface cam 46 (as the lower circumference cam contour 8), which has a contour with the same at least two peaks and two valleys, and an inner flange cam 3 (as the upper circumference cam contour 7) which corresponds to the end surface cam 46 and has the same circumferential cam contour, that is, at least two peaks and two valleys, and at least two slots 12, as shown in FIGS. 2a and 2b. Said inner flange cam 3 may be formed by pressure using a mold.

For replacing rollers without disassembling the whole mechanism, a hole 22 communicating with outside is provided inside the groove of the internal groove cam as shown in FIG. 2a, or said slots 12 extend from the upper circumferential cam contour 7 to the lower circumferential cam contour 8 as shown in FIGS. 1, 2b and 4. The above described slots 12 are both disposed at the lower dead point (the lower stopping position) as shown in FIGS. 4a, 4b, or both disposed at the upper dead point (the upper stopping position) as shown in FIG. 4c, the width of the slots 12 being at least the same as the diameter of the rollers.

The axially downward projection image of the working contour of the upper circumferential cam contour 7 of the internal groove cam according to the present invention does not overlap the working contour of the lower circumferential cam contour 8, or does not coincide with the same. Said internal groove cam may have inward-tipping upper circumferential cam contour 7 and/or lower circumferential cam contour 8 as shown in FIG. 9. The maximum pressure angle of the rising and/or descending curve(s) of the circumferential contour of the internal groove cam according to the present invention ranges from 40 to 80 degree.

The above described piston rods 5a have a single-leg or multi-leg structure, as shown in FIGS. 6a to 6d. The lower end of a bolt 23 which contacts the upper end of the piston 2 has a protrusion ring 79, the height of the protrusion portion being less than 1 mm, so as to ensure the seal between the bolt 23 and the piston 5 when the piston rod 5a is secured to the piston 5, as shown in FIGS. 6 and 6e.

Cylinder opening (guiding hole) 2 on the cylinder (cover) 1 according to the present invention may be designed to correspond to a single cylinder disposed coaxially with the internal groove cam as shown in FIG. 1, or cylinder openings are disposed at the positions where one circumference 50 or two circumferences 50, 51 centered the internal groove cam shaft intersect at least one of a bi-sector to a quinque-sector, as the cylinder openings 2 shown in FIGS. 7a to 7f. Since the cylinder opening 2 does not receive any lateral force, it may be formed with a ceramic surface.

The roller shaft of the present invention provides a plurality of segments which extend from the center to the periphery spaced at a equal angle, as shown as the roller shaft in FIGS. 5a to 5d and FIGS. 7a to 7f, said roller shaft having a through hole 55 at the center. The cross section of the segments of the above described roller shaft has rectangular or H shape at positions where the rollers are installed. Said roller shaft may be formed with steel or aluminum-titanium alloy having light weight and high strength, or may include carbon fiber and other nonmetallic materials for reducing the reciprocating inertial mass.

The above described roller shaft is articulated with the piston rod, as shown in FIGS. 8, 8a and 8b. A side hole 17 is provided at the position where the piston rod 5a is installed, and a piston rod 5a2b having a "П" shape is mounted on the side hole 17 of the roller shaft by means of a pin shaft 54, as shown in FIGS. 6b2 and 8. Or, the single-leg piston rod 5a having an arcuate lower end engages the roller shaft having an arcuate recess 80 so as to on one hand control the piston rod 5a to prevent from disengaging from the roller shaft 16 by means of a snap member and pin shaft 54, and on the other hand make the upper end of the piston rod swell in the axial plane of the roller shaft by a small magnitude. In addition, installing the piston rod in a rigid fixation manner is involved in the present invention.

In accordance with the present invention, a straight roller shaft 16 engages with the internal groove cam 6 or 6b with a groove having two peaks and two valleys or four peaks and four valleys. A three-leg roller shaft 16a engages with the internal groove cam 6a with a groove having three peaks and three valleys. A four-leg roller shaft 16b engages with the internal groove cam 6b having four peaks and four valleys. A five-leg roller shaft 16c engages with the internal groove cam having five peaks and five valleys.

The outer surface of the primary roller 9 and/or secondary roller 37 according to the present invention takes the form of cylinder or taper, which engages with the above described internal groove cam having inward tipping upper circumferential cam contour 7 and/or lower circumferential cam contour 8, as shown in FIG. 9, so as to reduce the "Edge Effect", and to facilitate adjustment of clearance between the primary roller and the secondary roller in the groove of the internal groove cam. The above described primary roller 9 always contact the lower circumferential cam contour 8 rather than the upper circumferential cam contour 7, while the secondary roller 37 always contact the upper circumferential cam contour 7 rather than the lower circumferential cam contour 8, so that the primary roller 9 and the secondary 37 will not invert the torque when they reciprocate up and down as the piston rod. The primary roller 9 and the secondary 37 may not be coaxial with each other, wherein rolling bearings or sliding bearings having rollers closely arranged therein may be used in order to improve the load capacity.

The above described internal groove cam and rollers are made of steel by casting or cold working, and the respective rolling surfaces are carburized or carbonitrided at the carburizing and carbonitridation temperature so as to make the size of the austenite grain of the surface greater than 10, which means the austenite grain is fine enough to prevent from cracking due to skinning initiated internally in order to elongate fatigue life thereof. Then the respective rolling surfaces are surface hardened at 790-830☐ which is lower than the carburizing and carbonitridation temperature so that the rolling surfaces may have a residual stress of at least 500 Mpa and a rupture stress of at least 2650 Mpa in order to elongate service life thereof.

The guiding roller or sliding block 27 according to the present invention has a through hole 55 at the center in which can receive the roller shaft, said hole having a similar outer profile to the cross section of the roller shaft where the sliding block is installed, as shown in FIGS. 10a and 10b. The sliding block 27 is formed with metal (mild steel, mild alloy steel, alloy aluminum etc.,) the sliding surface of which is a layer hardened by carburizing or carbonitriding, or a ceramic coating layer, or with ceramics so as to improve wearing resistance in order to elongate service life thereof.

Each of the fixed guide rails 4 according to the present invention has two opposite sides. Such fixed guide rails 4 disposed at bi-sect to quinque-sect positions on a circumference centered by the axis of the internal groove cam as shown in FIGS. 7a to 7f, the total amount of which may be two to five. A positioning boss 4c is provided on the outer edge of the fixed guide rail to restrict axial jump of the roller shaft. The surface of the above described fixed guide rail, which is removable from the guide rail seat 4d for replacing, may be formed by a metal member, made of such as carbon steel, alloy steel etc, providing a sliding surface of the guide rail comprising a layer hardened by carburizing, carbonitriding, or coating with ceramic, or a nonmetallic member made of such as ceramics to elongate the service life thereof.

The above described cylinder 1 having a cylinder opening 2 and fixed guide rail 4d circumferentially disposed at the lower end thereof is integrally formed, or formed by combining an upper portion 1a having a cylinder opening 2 and a lower portion 1b having fixed guide rails 4d circumferentially disposed at the lower end thereof by means of bolts.

The power transmission mechanism having an internal groove cam 6a according to an embodiment of the present invention utilizes an internal groove cam with a groove having three peaks and three valleys as mentioned above. The mechanism may have a single cylinder having a cylinder opening co-axially disposed with respect to the internal groove cam, or six cylinders having holes 2a disposed at the six intersection positions where two circumferences 50, 51 intersect tri-sectors 25. The lower ends of six piston rods 5a fixed to the piston in the single cylinder or pistons in the six cylinders 2 are equally mounted on the three segments 16a1 of one three-leg roller shaft 16a, as shown in FIGS. 6c and 15. Primary rollers 9 and secondary rollers 37 are disposed on the three segments near the outer ends thereof so as to roll in the groove of the internal groove cam 6a, in order to form a non-cantilevered structure freely supported at three ends without lateral force exerted by the piston to the cylinder walls. Three guiding rollers or sliding blocks 27 are disposed respectively on the three segments of the roller shaft 16a at positions corresponding to the three fixed guide rails 4 axially connected to the lower end of the cylinder at the tri-sect positions on the circumference, so that they can move along the three fixed guide rails 4 respectively, and the counteracting force driving the internal groove cam 6a is applied to the surfaces of the three fixed guide rails 4 through the three guiding rollers or sliding blocks 27.

If the power transmission mechanism having an internal groove cam according to another embodiment of the present invention utilizes an internal groove cam 6b with a groove having four peaks and four valleys, it is also possible to design four cylinder openings 2 that are provided at the four intersection positions where one circumference 50 centered by the axis of the internal groove cam intersect the quarter-sectors 34, as shown in FIG. 7b, or to design eight cylinder openings 2 that are provided at the eight intersection positions where two circumference 50, 51 intersect the quarter-sectors 34 as shown in FIG. 7e. The lower parts of the four or eight piston rods 5 being fixed to the pistons 5 through the cylinder openings 2 of the four cylinders or eight cylinders are mounted on the four segments of a four-leg roller shaft. Four secondary rollers 37 and four primary rollers 9 are mounted on the four segments near the four outer ends of the roller shaft 16b respectively so as to roll in the groove of the internal groove cam 6b in order to form a non-cantilevered structure freely supported at four ends without lateral force by the piston exerted to the cylinder. Four guiding rollers or sliding blocks 27 are disposed at the positions where the four segments of the roller shaft 16b at positions corresponding to the four fixed guide rails 4 axially connected to the lower end of the cylinder at the quarter-sect positions on a circumference, so that they can move along the four fixed guide rails 4, and the counteracting force driving the internal groove cam 6b is applied to the surface of the four fixed guide rails 4 through the four guiding rollers or sliding blocks 27, as shown in FIGS. 14 and 16.

The power transmission mechanism having an internal groove cam according to further another embodiment of the present invention utilizes an internal groove cam with having five peaks and five valleys, which fit ten cylinder openings 2 that are provided at the ten intersection positions where two circumferences 50, 51 intersect quinque-sectors 68, as shown in FIG. 7f. Such internal groove cam fits a five-leg roller shaft 16c. The lower part of the ten piston rods 5a fixed to the ten pistons 5 through the ten cylinder openings 2 are equally mounted on the five segments of the five-leg roller shaft respectively. Primary rollers 9 and secondary rollers 37 are provided on the four segments near the outer ends thereof so as to roll in the groove of the internal groove cam 6a, in order to form a non-cantilevered structure freely supported at four ends without lateral force exerted by the piston to the cylinder walls. Four guiding rollers or sliding blocks 27 are disposed respectively on the four segments of the roller shaft 16a at positions corresponding to the four fixed guide rails 4 axially connected to the lower end of the cylinder at the tri-sect positions on the circumference, so that they can move along the four fixed guide rails 4 respectively, and the counteracting force driving the internal groove cam 6a is applied to the surfaces of the four fixed guide rails 4 through the four guiding rollers or sliding blocks 27.

If an internal groove cam having two peaks and two valleys is utilized in the power transmission mechanism having an internal groove cam according to the present invention rotates for one round, the reciprocating assembly (the piston rod 5, the primary rollers 9, the secondary rollers 37, the roller shaft 16, the guiding rollers or sliding blocks 27) reciprocates up and down for four times. If an internal groove cam having three peaks and three valleys rotates for one round, the reciprocating assembly reciprocates up and down for six times. If an internal groove cam having four peaks and four valleys rotate for one round, the reciprocating assembly reciprocates up and down for eight times.

It is obvious that the advantages include: 1) The present invention has a simple structure to achieve the conversion between reciprocating motions of a roller shaft and the rotary motion of a internal groove cam without provision of a cylinder and a piston. 2) Even a piston is provided, there is no lateral force exerted to the cylinder wall so that the service life of the piston and the cylinder can be improved. 3) A short piston can be designed without limitation of the shape of the piston to an ellipse and manufactured easily. 4) There is no inverse the torque produced by the roller so that the service life thereof can be improved. 5) The primary and secondary rollers may be replaced without the need of disassembling so that it is efficient for maintenance and service. 6) The power transmission mechanism for motion conversion of present invention may be applied to the field of internal and external combustion engine, pneumatic or hydraulic motor or pump.

DESCRIPTION OF THE DRAWINGS

The structure of the embodiments of the present invention is illustrated in the following drawings, in which:

FIG. 1 is a front cross section view illustrating the motion conversion mechanism between a roller shaft in parallel reciprocation movement and an internal groove cam in rotary motion.

FIG. 1a is a front cross section view illustrating the power transmission mechanism of an internal groove cam having single cylinder.

FIG. 2a is a cross section view of an internal groove cam 6b having four peaks, four valleys and four slots 12 which is formed by combining an end surface cam 46 and an inner flange cam 3.

FIG. 2b is a cross section view of an internal groove cam 6b having three peaks, three valleys and three slots 12 which is formed by combining an end surface cam 46 and an inner flange cam 3.

FIG. 2c illustrates an internal groove cam 6 having two peaks and two valleys and two slots 12.

FIG. 3 is a partially cross section view of the pressurized lubricant oil path.

FIG. 4a is a schematically view illustrating the positions of the primary rollers near the both ends of the roller shaft 16 in the groove of the internal groove cam 6 having two peaks and two valleys, in which the circumferential wall is shown in a stretched state and an enclosing block 13 is not installed.

FIG. 4b is a schematically view illustrating the positions of the three primary rollers 9 on the three segments of the three-leg roller shaft 16a in the groove of the internal groove cam 6b having three peaks and three valleys, in which the circumferential wall is shown in a stretched state and an enclosing block 13 is not installed.

FIG. 4c is a schematically view illustrating the positions of the four primary rollers 9 on the four segments of the four-leg roller shaft 16a in the groove of the internal groove cam 6b having four peaks and four valleys, in which the circumferential wall is shown in a stretched state and an enclosing block 13 is not installed.

FIG. 5a illustrates a straight roller shaft 16 on which a piston rod 5a2b having a "Π" shape at its lower part is mounted through a central hole 55 in center and two side holes 17 in two of the segments of the roller shaft respectively.

FIG. 5b1 and 5b2 are front and plan view of a three-leg roller shaft 16a which has a central hole 55 and three equally spaced segments on which six side holes 17 for receiving the "⊓" shaped lower parts of six piston rods 5a2b are provided respectively.

FIG. 5c1 and 5c2 are front and plan view of a four-leg roller shaft 16b which has a central hole 55 and four equally spaced segments on which eight side holes 17 for receiving the "⊓" shaped lower parts of six piston rods 5a2b are provided respectively.

FIG. 5d is a plan view of a five-leg roller shaft 16d which has a central hole 55 and five equally spaced segments.

FIG. 6 is a partially cross section view illustrating how the piston 5 is fixed to the piston rod 5a by means of a bolt 23 having a ring 79.

FIG. 6a is a schematic view illustrating the installment state of the lower part of the single-leg piston rod 5a1 and the roller shaft.

FIG. 6b1 is a schematic view illustrating the installment state of the lower part of the two-leg piston rod 5a2a and the roller shaft.

FIG. 6b2 is a schematic view illustrating the installment state of the gate-shaped lower parts of the two-leg piston rod 5a2b and the roller shaft.

FIG. 6c is a schematic view illustrating the installment state of the lower parts of the three-leg piston rod 5a3 and the corresponding roller shaft 16a.

FIG. 6d is a schematic view illustrating the installment state of the lower parts of the four-leg piston rod 5a4 and the corresponding roller shaft 16b.

FIG. 6e is a front plan view of a bolt 23.

FIG. 8a1 is a front view illustrating the roller shaft 16 having an arcuate recess 80, on which a single leg piston rod 5a1 with an arcuate lower end and a sliding block 27(or snap member 81) are mounted.

FIG. 8a2 is a left side section view of FIG. 8a1.

FIG. 8b1 is a front view illustrating the connection of the single leg piston rod 5a1 having an arcuate lower end is articulated with the roller shaft 16 having an arcuate recess 80.

FIG. 8b2 is a plan view of FIG. 8b1.

FIG. 12b1 is a section view illustrating a double-cylinder and four-stroke internal combustion engine having the internal groove cam 6.

FIG. 12b2 is a view illustrating a double-cylinder and four-stroke internal combustion engine having the internal groove cam 6.

REFERENCE NUMERALS LIST

Figure 7B:
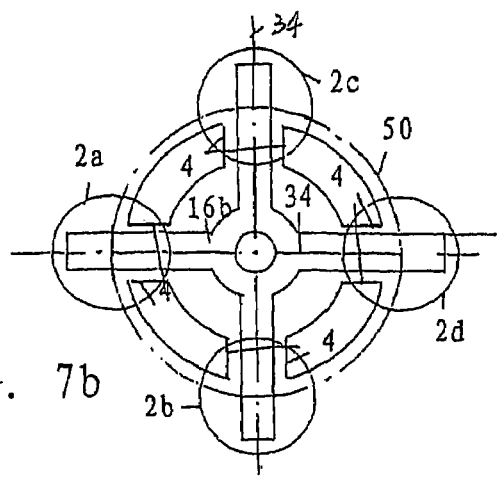
FIG. 7b is a schematically plan view illustrating four cylinder openings 2 that are provided at the four positions where a circumference 50 intersects the quarter-sectors 34, the straight roller shaft 16 having four equally spaced segments and four fixed guide rails 4 located at positions which divides the circumference into four equal parts.

1 cylinder (cover), 2 cylinder opening (guiding hole), 3 inner flange cam, 4 fixed guide rail, 4a, 4b guide rail surfaces mounted on the fixed guide rail seat, 4c positioning boss of the fixed guide rail seat, 4d fixed guide rail seat, 5 piston, 5a piston rod, 5a1 single-leg piston rod, 5a2a two-leg piston rod, 5a2b "Π"-shaped two-leg piston rod, 5a3 three-leg piston rod, 5a4 four-leg piston rod, 6 internal groove cam with a cam groove having two peaks and two valleys, 6a internal groove cam with a cam groove having three peaks and three valleys, 6b internal groove cam with a cam groove have four peaks and four valleys, 6i through hole in the upper and lower end surface of the internal groove cam, 7 upper circumferential cam contour of the internal groove cam, 8 lower circumferential cam contour of the internal groove cam, 9 roller, 9a primary roller having a taper shape, 10 output shaft, 11 valve, 12 slot, 13 slot enclosing block, 14 central hole at the upper end of the internal groove cam, 15 cam support (cam box), 16 straight roller shaft, 16a three-leg roller shaft, 16a1 three segments of the three-leg roller shaft, 16b four-leg roller shaft, 16b1 four segments of the four-leg roller shaft, 16c five-leg roller shaft, 17 side hole of the roller shaft, 18 garter spring, 19 air port, 20 partially cut line, 21 bearing, 22 through hole in the groove of the internal groove cam, 23 fixing bolt, 24 oil ring, 25 tri-sector, 26 scavenging port, 27 guiding roller or sliding block, 28 cylinder cover, 29 peak of the circumferential cam contour, 30 valley of the circumferential cam contour, 31 power (intake) curve contour, 32 exhaust (compress) curve contour, 33a upper end surface bearing, 33a1 circular oil channel of the upper end surface bearing, 33b lower end surface bearing, 34 quarter-sector, 35 camshaft for valve system, 36 timing gear, 37 secondary roller, 37a secondary roller having a taper shape, 38 transmission gear, 39 fixing key, 40 bevel gear, 41 timing chain or timing belt, 42 oil pump, 43 timing gear, 44 leaf valve, 45 side hole of the cam box, 46 end surface cam, 47 bevel gear on the air distribution transmission shaft, 48 air distribution transmission shaft, 49 timing gear for the air distribution transmission shaft, 50 outer circumference, 51 inner circumference, 52 broken line for synchronization, 53 thread hole for engaging the enclosing block 13, 54 pin shaft, 55 through hole, 56 heater, 57 recuperator, 58 cooler, 59 transmission shaft, 60 reversing valve, 60a reversing valve seat, 60b reversing valve core, 61 reversing gear, 62 intake port, 63 exhaust port, 64 air channel, 65 oil channel, 66 oil hole, 67 bi-sector, 68 quinque-sector, 69 one-way intake valve, 70 one-way exhaust valve, 71 free piston, 73 pneumatic reciprocating pump, 74 guiding rod, 75 inlet of the intake pipe, 76 outlet of the exhaust pipe, 77 one-way valve seat, 78 small nozzle hole, 79 ring, 80 arcuate recess, 81 snap member.

MODE OF CARRYING OUT THE INVENTION

Embodiment 1

Figure 21:
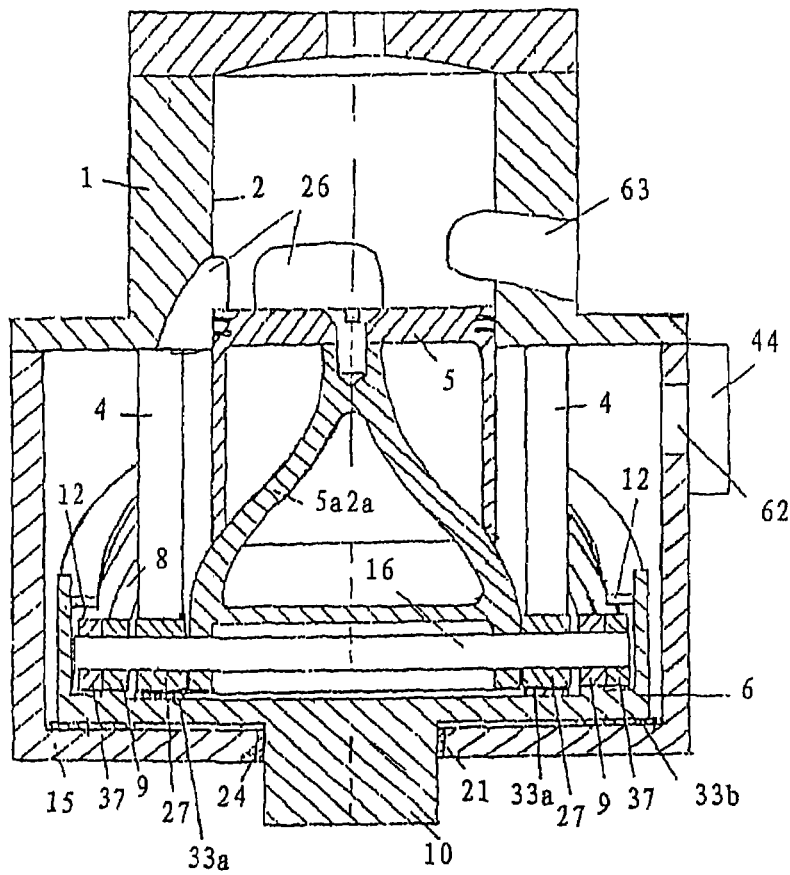
FIG. 21 is a section view illustrating a single-cylinder and double-stroke internal combustion engine and having the internal groove cam 6.

A single-cylinder and two-stroke internal combustion engine comprising a power transmission mechanism having an internal groove cam is shown in FIG. 21. The engine comprises an internal groove cam 6, a cylinder cover 28, a cylinder having a cylinder opening 2, an exhaust port 63 and a scavenging port 26, a piston 5 and a piston rod 5a2a, two primary rollers 9, two secondary rollers 37, two guiding rollers or sliding blocks 27, a roller shaft 16, two fixed guide rails 4, an intake port 62, and a cam box 15. The internal groove cam is provided in the cam box 15. The cylinder 1 having the cylinder cover 28 at the upper part thereof and the cylinder opening 2 axially disposed therewith is fixed to the cam box 15. A roller shaft 16 is disposed at the lower part of the piston rod 5a2a fixed to the piston 5 in the cylinder opening 2, and perpendicular to the cylinder opening 2. Two primary rollers 9 and two secondary rollers 37 are disposed near the two ends of the roller shaft at the positions corresponding to the circumferential cam contour so that they are received in the groove of the internal groove cam through two slots 12 in the upper circumferential cam contour of the internal groove cam 6 to roll following the circumferential contour, which forms a non-cantilevered structure freely supported at two ends. Two guiding rollers or slide blocks 27 are further disposed on the roller shaft at corresponding positions to the fixed guide rails 4 connected with the lower end of the cover 1 in the axial direction of the internal groove cam so as to roll or slide up and down along the fixed guide rails 4. An intake port 50 with a leaf valve 44 are provide in the side of the cam box 15, and meanwhile, an exhaust port 19 and a scavenging port 26 communicating with the cam box are provided in the wall of the cylinder.

Embodiment 2

Figure 11:
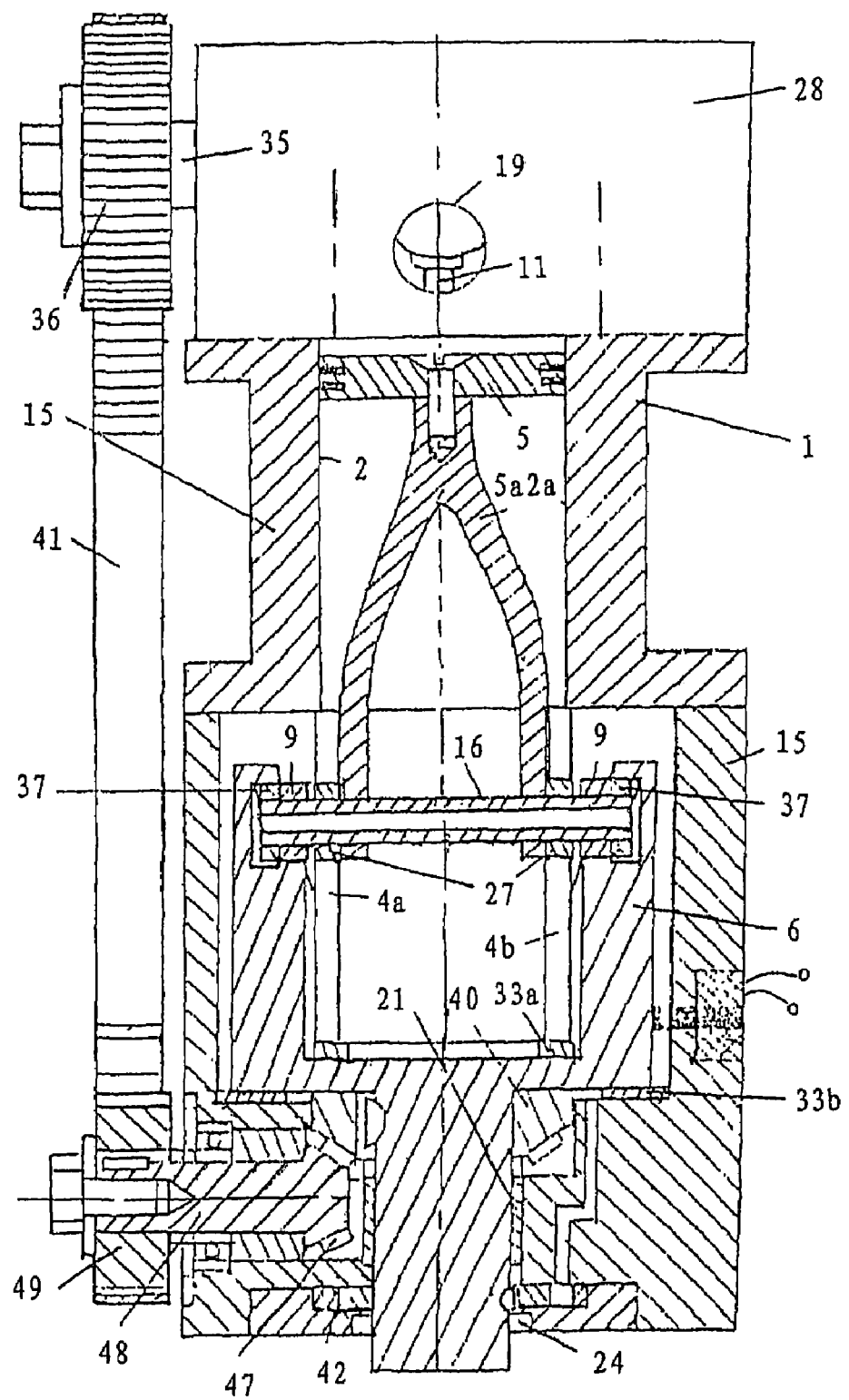
FIG. 11 is a front cross section view illustrating a single-cylinder and four-stroke internal combustion engine having the internal groove cam 6.

A single-cylinder and four-stroke internal combustion engine comprising a power transmission mechanism having an internal groove cam is shown in FIG. 11. The engine comprises an internal groove cam 6, a cylinder cover 28 on which a part of members forming the valve system, such as a valve and a camshaft and etc., are mounted, a cylinder 1 having a cylinder opening 2, a piston 5 and a piston rod 5a2a, two primary rollers 9, two secondary rollers 37, two guiding rollers or sliding blocks 27, a roller shaft 16, two fixed guide rails 4, a cam box 15. The internal groove cam 6 is provided in the cam box 15. The cylinder 1 having the cylinder cover 28 is fixed to the cam box 15. Two primary rollers 9 and two secondary rollers 37 are disposed near the two ends of the roller shaft at the positions corresponding to the circumferential cam contour so that they are received in the groove of the internal groove cam through two slots 12 in the upper circumferential cam contour of the internal groove cam 6 to roll following the circumferential contour, which forms a non-cantilevered structure freely supported at two ends. Two guiding rollers or slide blocks 27 are further disposed on the roller shaft at corresponding positions to the fixed guide rails 4 connected with the lower end of the cover 1 in the axial direction of the internal groove cam so as to roll or slide up and down along the fixed guide rails 4.

If the internal groove cams 6 utilized in both Embodiment 1 and Embodiment 2 has a cam groove with two peaks and two valleys, the cam shaft 35 of an four-stroke internal combustion engine rotates for one round as the cam rotate for one round, at the same time, the piston works once. The piston will work twice if said internal combustion engine is replaced by a double-stroke internal combustion engine. If the internal groove cams 6 has a cam groove with three peaks and three valleys, the camshaft 35 of a four-stroke internal combustion engine rotates for three rounds as the cam rotates for two rounds, at the same time, the piston works three times. The piston will work six times if said internal combustion engine is replaced by a two-stroke internal combustion engine. If the internal groove cams 6b has a cam groove with four peaks and four valleys, the camshaft 35 for valve system of a four-stroke internal combustion engine rotates for two rounds as the cam rotates for one round, and the piston work twice. The piston will work four times if said internal combustion engine is replaced by a two-stroke internal combustion engine.

Embodiment 3

Figure 7A:
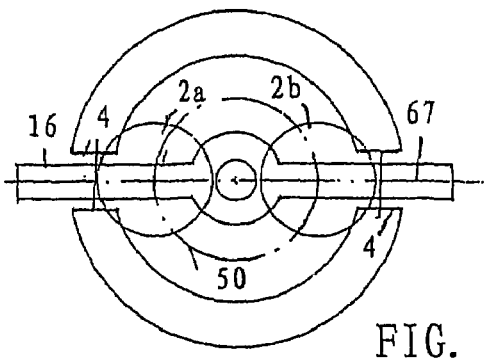
FIG. 7a is a schematically plan view illustrating two cylinder openings 2 that are provided at the two positions where a circumference 50 intersects the bi-sectors 67, the straight roller shaft 16 having two equally spaced segments and two fixed guide rails 4 located at positions which divides the circumference into two equal parts.
Figure 7C:
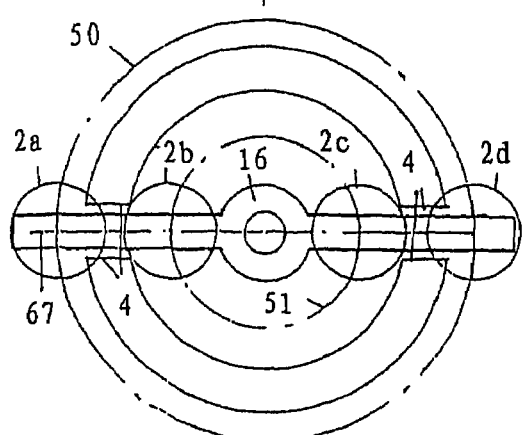
FIG. 7c is a schematically plan view illustrating four cylinder openings 2 that are provided at the four positions where two circumferences 50, 51 intersect the bi-sectors 67, the straight roller shaft 16 having two equally spaced segments and two fixed guide rails 4 located at positions which divides the circumference into two equal parts.
Figure 12A:
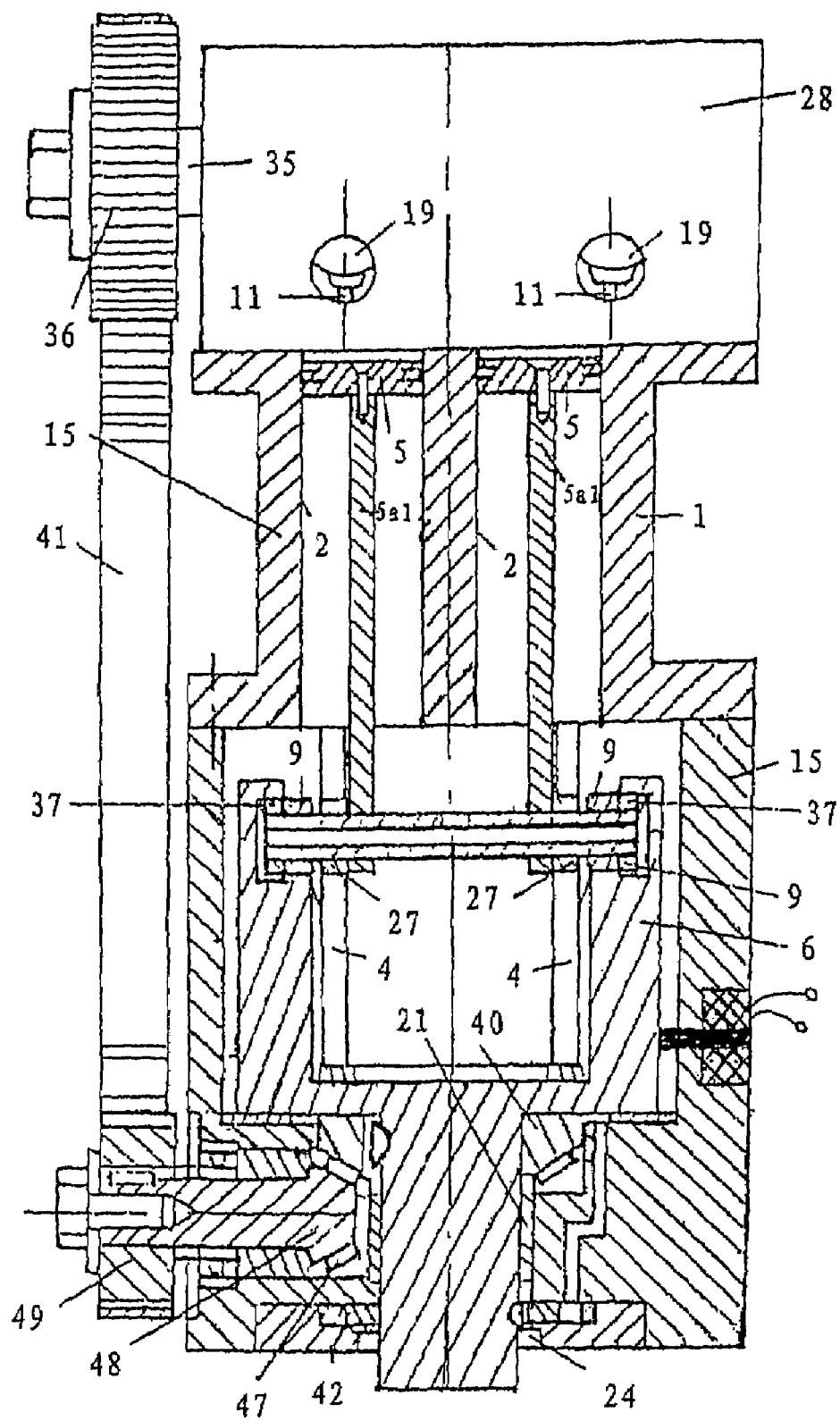
FIG. 12a is a section view illustrating a double-cylinder and four-stroke internal combustion engine, and having the internal groove cam 6 having timing belt provided outside.

A double-cylinder and four stroke inline internal combustion engine comprises a power transmission mechanism having an internal groove cam. The engine comprises an internal groove cam 6 or 6b, a cylinder cover 28 on which a part of members forming the valve system, such as a valve and a camshaft and etc., are mounted, a cylinder 1 having two cylinder openings 2 disposed at the positions where one circumference 50 intersects the bi-sectors 67, two pistons 5, two piston rods 5a, two primary rollers 9, two secondary rollers 37, two guiding rollers or sliding blocks 27, a roller shaft 16, two fixed guide rails 4, a cam box 15. The internal groove cam 6 is provided in the cam box 15. The cylinder 1 having the cylinder cover 28 at the upper part thereof is fixed to the cam box 15. The lower parts of the two piston rods 5a fixed to two pistons 5 in the two cylinder openings 2 of the cylinder 1 are mounted on the roller shaft 16 so that the two pistons 5 and the roller shaft 16 form a structure reciprocating up and down together as a unit. Two primary rollers 9 and two secondary rollers 37 are disposed near the two ends of the roller shaft at the positions corresponding to the circumferential cam contour so that they are received in the groove of the internal groove cam through two slots 12 in the upper circumferential cam contour of the internal groove cam 6 to roll following the circumferential contour, which forms a non-cantilevered structure freely supported at two ends. Two guiding rollers or slide blocks 27 are further disposed on the roller shaft at corresponding positions to the two inline fixed guide rails 4 connected with the lower end of the cover 1 in the axial direction of the internal groove cam at positions where the roller shaft is divided equally, to roll or slide up and down along the fixed guide rails 4. As shown in FIGS. 7a, 12a and 12b, the cams for charging air and exhausting air in the above mentioned two cylinders are designed to be in opposite directions, that is, their phase difference is 180 degree, so that one piston is in compression stroke while the other is in intake stroke when the two pistons are moving upward, and one piston is in power stroke while the other is in exhaust stroke when the two pistons 5 are moving downward. The rotation for one round of the internal groove cam 6 will bring the camshaft 35 for valve system to rotate for one round, so as to make each piston works once. If the internal groove cam 6b rotates for one round, the camshaft 35 for valve system rotates for two rounds, then each of the two pistons 5 works twice. It is apparent that efficiency of the cylinder and power per liter are improved in the internal combustion engine using the present invention.

Embodiment 4

Figure 13A:
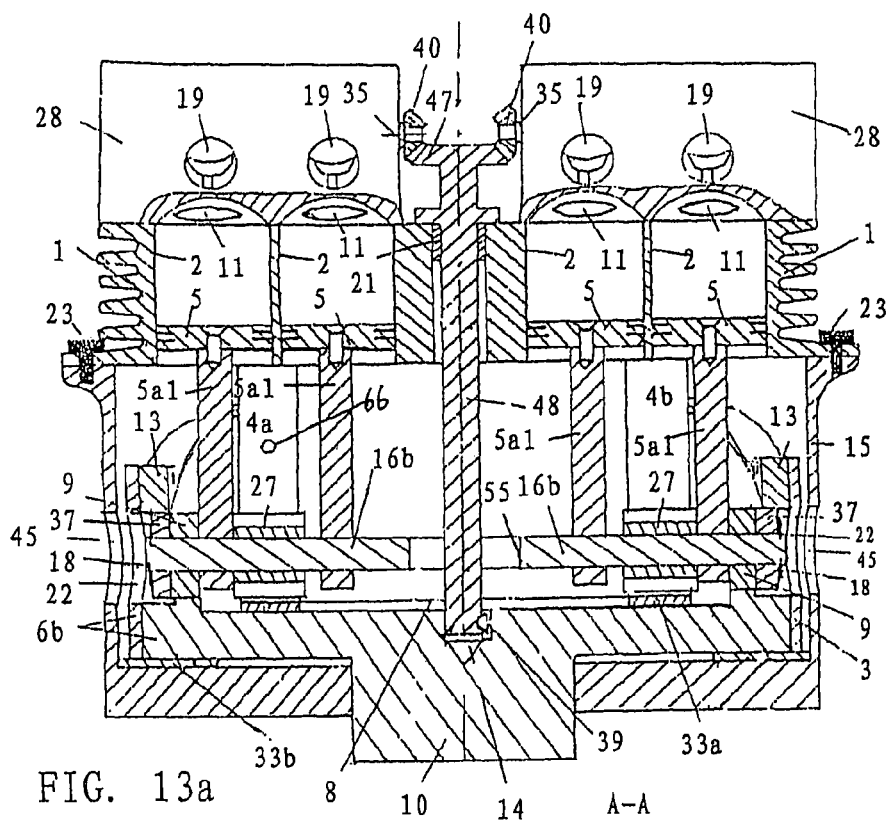
FIG. 13a is a section view illustrating a four-cylinder and four-stroke inline internal combustion engine having the internal groove cam 6 with a cam groove having two peaks and two valleys.
Figure 13B:
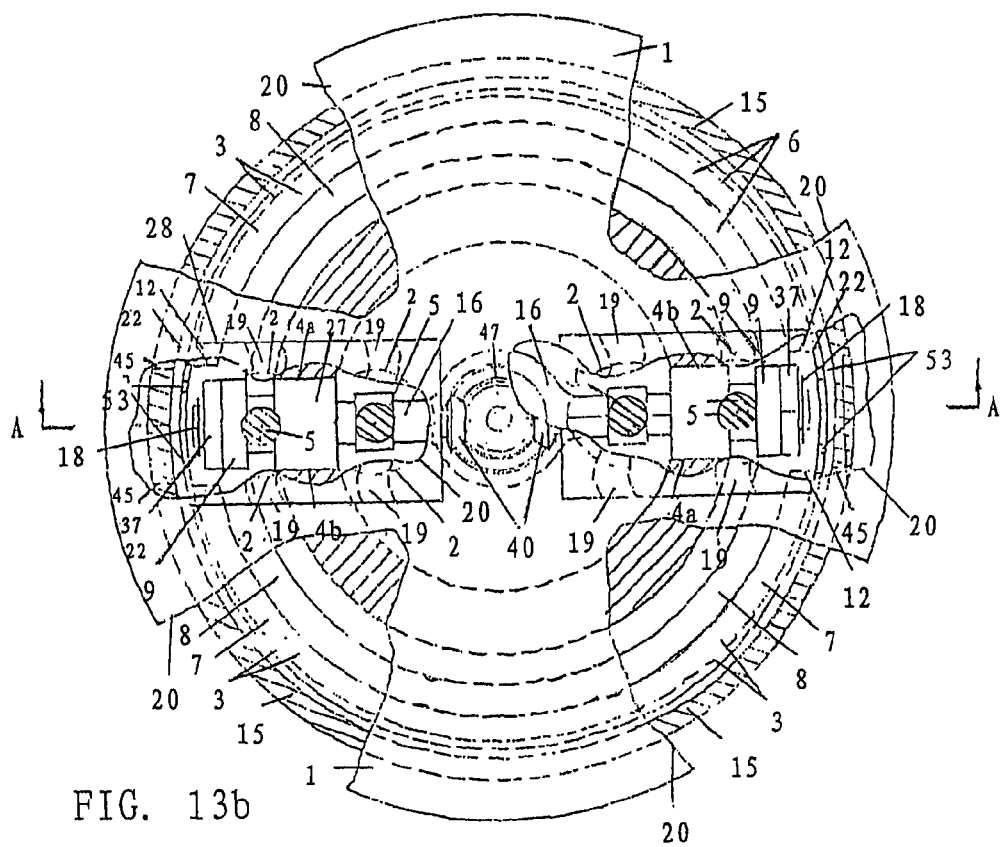
FIG. 13b is a schematically view illustrating a four-cylinder and four-stroke inline internal combustion engine having the internal groove cam 6 with a cam groove having two peaks and two valleys.
Figure 14A:
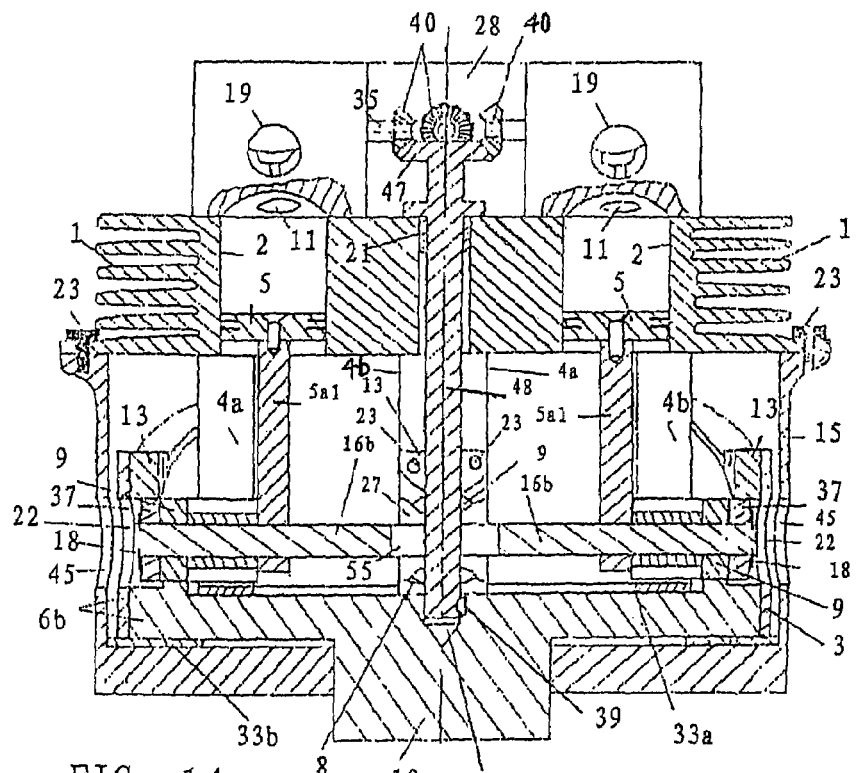
FIG. 14a is a section view illustrating a four-cylinder and four-stroke internal combustion engine with cylinders being arranged circumferentially having the internal groove cam 6 with a cam groove having two peaks and two valleys.
Figure 14B:
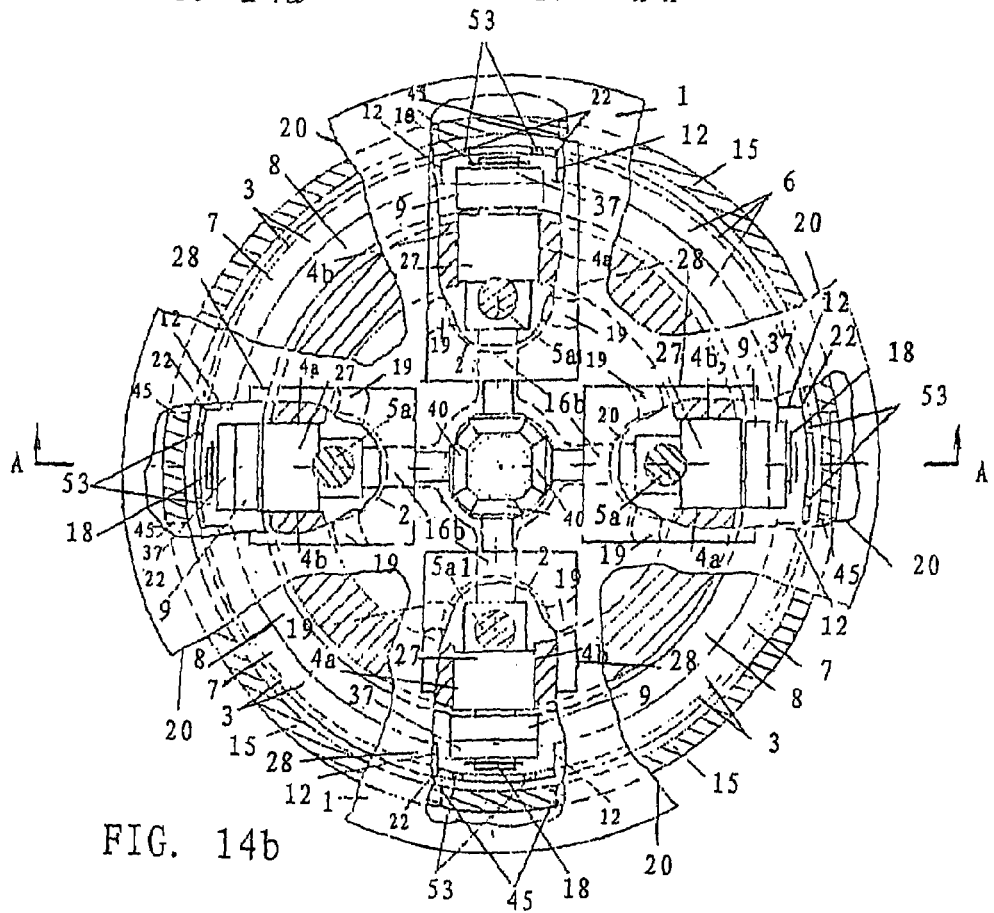
FIG. 14b a schematically view illustrating a four-cylinder and four-stroke internal combustion engine with cylinders being arranged circumferentially having the internal groove cam 6 with a cam groove having two peaks and two valleys.
Figure 15A:
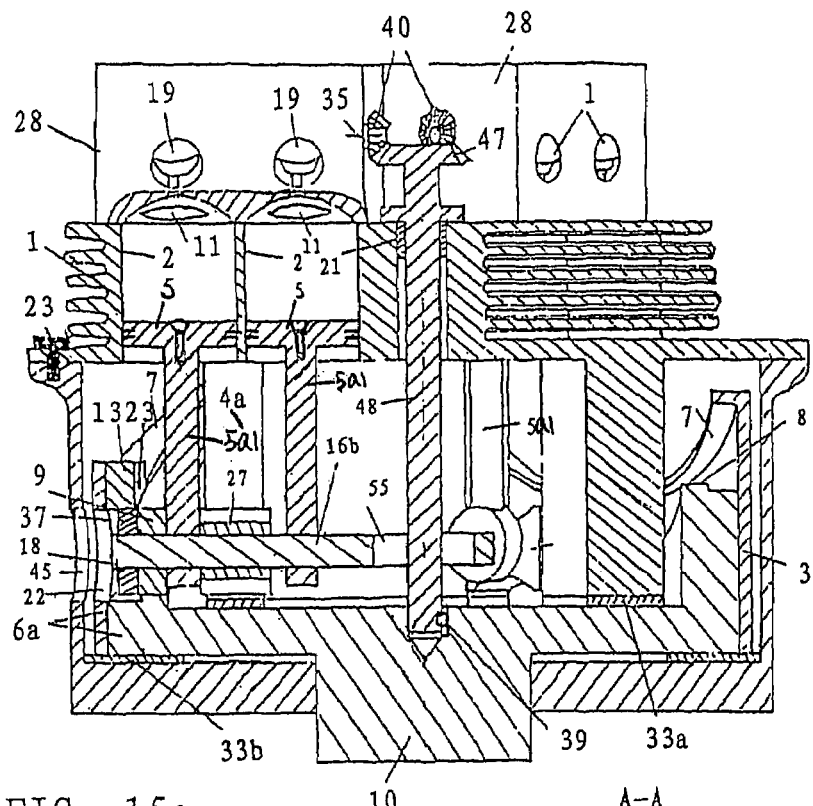
FIG. 15a is a section view illustrating a six-cylinder and four-stroke internal combustion engine with cylinders being arranged along two circumferences having the internal groove cam 6 with a cam groove having three peaks and three valleys.
Figure 15B:
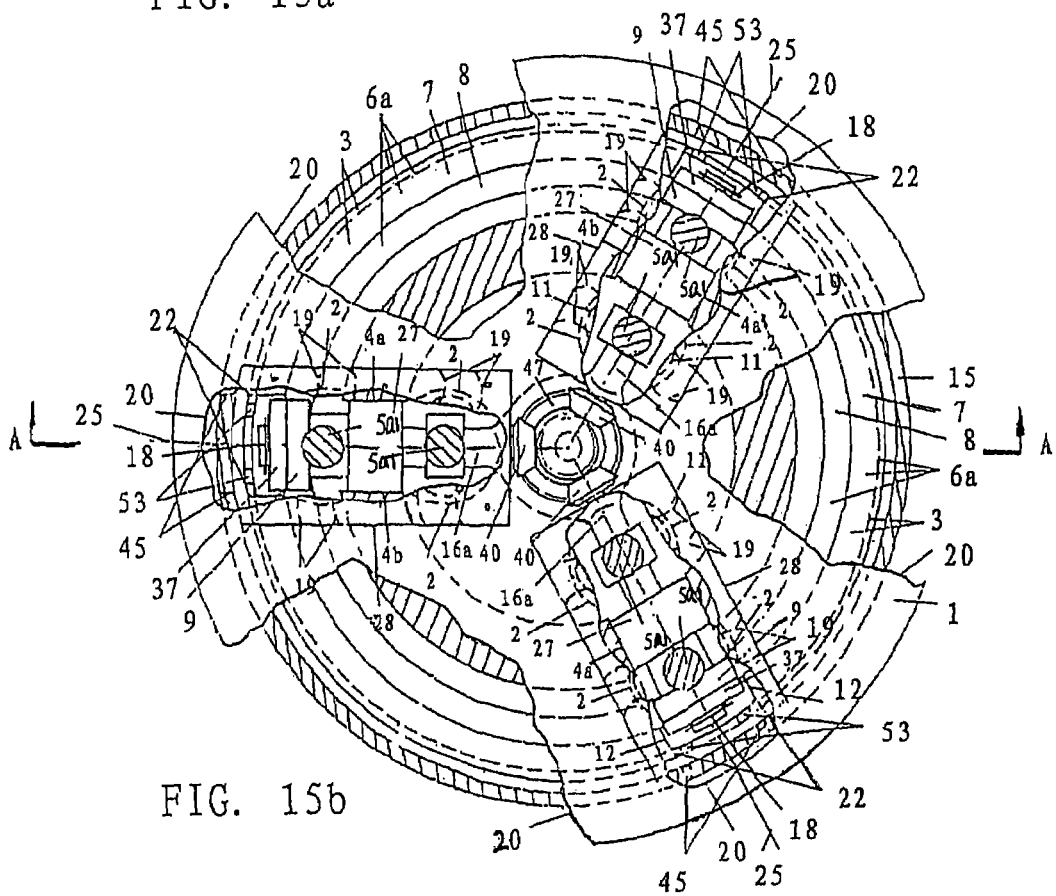
FIG. 15b a schematically view illustrating a six-cylinder and four-stroke internal combustion engine with cylinders being arranged along two circumferences having the internal groove cam 6 with a cam groove having three peaks and three valleys.
Figure 16A:
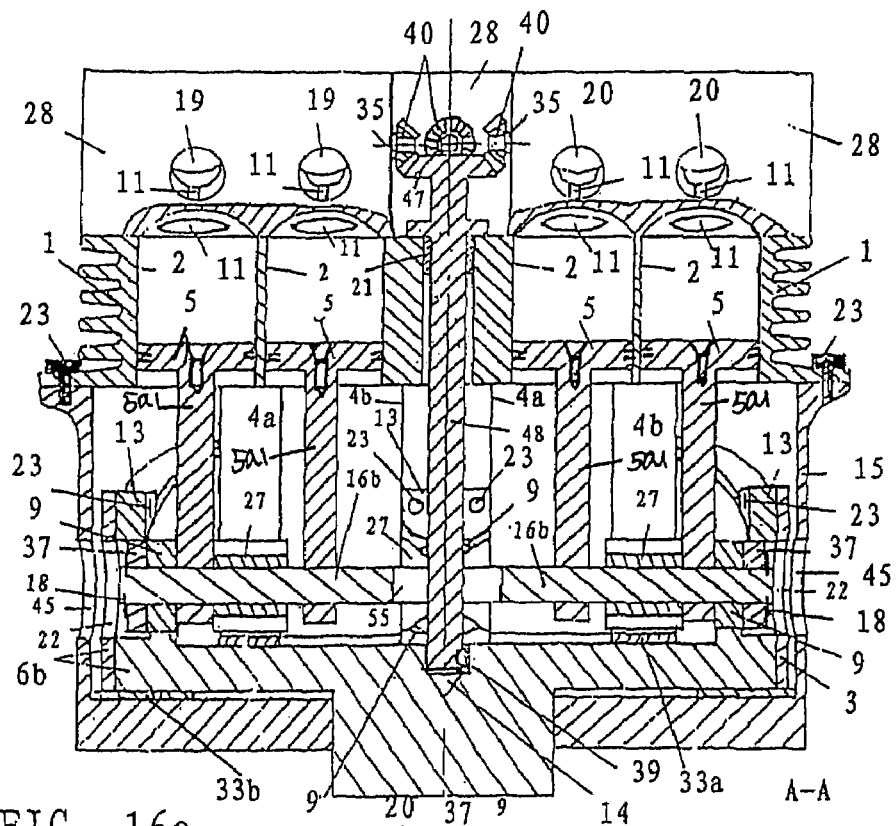
FIG. 16a is a section view illustrating an eight-cylinder and four-stroke internal combustion engine with cylinders being arranged along two circumferences having the internal groove cam 6 with a cam groove having four peaks and four valleys.
Figure 16B:
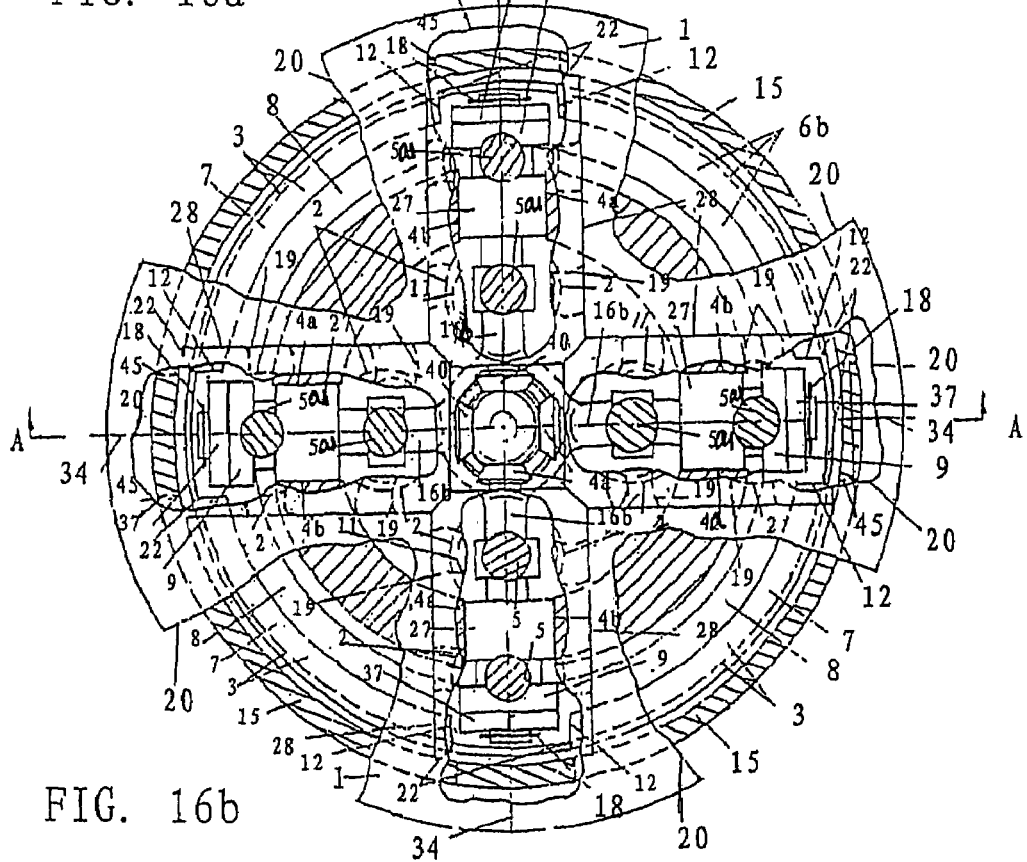
FIG. 16b a schematically view illustrating a eight-cylinder and four-stroke internal combustion engine with cylinders being arranged along two circumferences having the internal groove cam 6 with a cam groove having four peaks and four valleys.

A four-cylinder and four-stroke inline internal combustion engine comprises a power transmission mechanism having an internal groove cam as shown in FIG. 13. The engine comprises an internal groove cam 6 or 6b, a cylinder cover 28 on which a part of members forming the valve system, such as a valve and a camshaft and etc., are mounted and having four combustion chambers, a cylinder 1 having four cylinder openings 2 linearly arranged at the four positions where two circumference 50, 51 intersects the bi-sectors 67, four pistons 5, four piston rods 5a, two primary rollers 9, two secondary rollers 37, two guiding rollers or sliding blocks 27, a roller shaft 16, two fixed guide rails 4, a cam box 15. The internal groove cam 6 is provided in the cam box 15. The cylinder 1 having the cylinder cover 28 at the upper part thereof and linearly arranged with four cylinder openings 2 is fixed to the cam box 15. The lower parts of the four piston rods 5a fixed to the four pistons 5 in the four cylinders holes 2 are all mounted on the roller shaft 16 which is perpendicular to the piston rods, so that the four piston rods S and the roller shaft 16 reciprocates up and down in synchronism as a unit. Two primary rollers 9 and two secondary rollers 37 are disposed near the two ends of the roller shaft at the positions corresponding to the circumferential cam contour so that they are received in the groove of the internal groove cam through two slots 12 in the upper circumferential cam contour of the internal groove cam 6 to roll following the circumferential contour, which forms a non-cantilevered structure freely supported at two ends. Two guiding rollers or slide blocks 27 are further disposed on the roller shaft at corresponding positions to the fixed guide rails 4 connected with the lower end of the cover 1 in the axial direction of the internal groove cam so as to roll or slide up and down along the fixed guide rails 4.

The cams for charging and exhausting air respectively corresponding to two cylinders may be designed to have the same opening or closing angles so that the two cylinders intake, compress, work and exhaust in synchronism, while the cams for charging and exhausting air respectively corresponding to the other two cylinders may be designed to have the same opening or closing angles so that the other two cylinders intake, compress, work and exhaust in synchronism too. It is designed that phase difference between the former two cylinders and the latter two cylinders is 180 degree so that the two cylinders are in power stroke while the other two cylinders are in exhaust stroke when the four pistons are all moving upward. If the internal groove cam 6 rotates for one round, each of the four cylinders work once, that is, four times in total. If the internal groove cam 6b rotates for one round, each of the four cylinders works twice, that is, eight times in total. It is apparent that efficiency of the cylinder and power per liter are improved in the internal combustion engine using the present invention.

In the above Embodiments 2, 3 and 4, the camshaft 35 for valve system mounted on the cylinder cover 28 transmits motion between a timing gear 49 disposed at the outer end of the transmission shaft 48 for valve system and a timing gear 36 disposed at one end of the camshaft 35 for valve system through the engagement of a bevel gear 40 that is disposed at the lower end of the internal groove cam 6 with a bevel gear 47 that is disposed at one end of the transmission shaft 48 for valve system horizontally disposed at the lower part of the cam box 15 by means of a timing belt or chain 41, as shown in the transmission part for valve system shown in FIGS. 11 and 12a.

Embodiment 5

A four-cylinder and four-stroke internal combustion engine with four cylinders disposed circumferentially and spaced by 90 degrees comprises an internal groove cam 6b. The engine comprises an internal groove cam 6b, a cylinder 1 having four cylinder openings 2 disposed at the four positions where one circumference 50 intersects quarter-sectors 34, four cylinder covers 28 on each of which a part of members forming the valve system, such as a valve and a camshaft and etc., are mounted, four pistons 5, four piston rods 5a, four primary rollers 9, four secondary rollers 37, four guiding rollers or sliding blocks 27, a four-leg roller shaft 16b, four fixed guide rails 4 extending axially and equally disposed on a circumference, a cam box 15. The internal groove cam 6b is provided in the cam box 15. The cylinder 1 having the above-mentioned four cylinder openings 2 and four cylinder covers 28 at the upper part thereof is fixed to the cam box 15. The lower parts of the four piston rods 5a fixed to the four pistons 5 in the four cylinders 2 are mounted respectively on the four segments of the four-leg roller shaft 16b which is perpendicular to the piston rods, so that the four pistons 5 and the four-leg roller shaft 16b reciprocates up and down in synchronism as a unit. Four primary rollers 9 and four secondary rollers 37 are disposed near the outer ends of the segments of the four-leg roller shaft 16b respectively at the positions corresponding to the circumferential cam contour so that they are received in the groove of the internal groove cam through four slots 12 in the upper circumferential cam contour of the internal groove cam 6 to roll following the circumferential contour, which forms a non-cantilevered structure freely supported at four ends. Four guiding rollers or slide blocks 27 are further disposed on the four-leg roller shaft at corresponding positions to the fixed guide rails 4 connected with the lower end of the cylinder 1 and extending in the axial direction of the internal groove cam so as to roll or slide up and down along the fixed guide rails 4.

The cams for charging and exhausting air of two camshafts 35 on two corresponding cylinder covers 28 disposed diagonally may be designed to have the same opening or closing angles so that the two cylinders intake, compress, work and exhaust in synchronism, while the cams for charging and exhausting air of two camshafts 35 on the other two corresponding cylinder covers 28 disposed diagonally may be designed to have the same opening or closing angles so that the other two cylinders intake, compress, work and exhaust in synchronism too. It is designed that phase difference between the former two cylinders and the latter two cylinders is 180 degree so that the two cylinders are in compression stroke while the other two cylinders are in exhaust stroke when the four pistons are all moving upward; the two cylinders are in power stroke while the other two cylinders are in intake stroke when the four pistons are all moving downward.

The pistons reciprocate eight times when the above internal groove cam 6b with a groove having four peaks and four valleys rotates for one round, that is, each of the four cylinders works twice, that is, eight times in total. It is apparent that the efficiency of the cylinder and power per liter are improved four times.

Embodiment 6

Figure 7D:
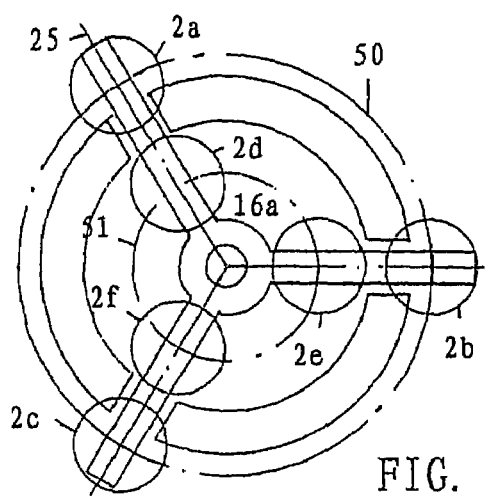
FIG. 7d is a schematically plan view illustrating six cylinder openings 2 that are provided at the six positions where two circumferences 50, 51 intersect the tri-sectors 25, the straight roller shaft 16 having three equally spaced segments and three fixed guide rails 4 located at positions which divides the circumference into three equal parts.
Figure 7E:
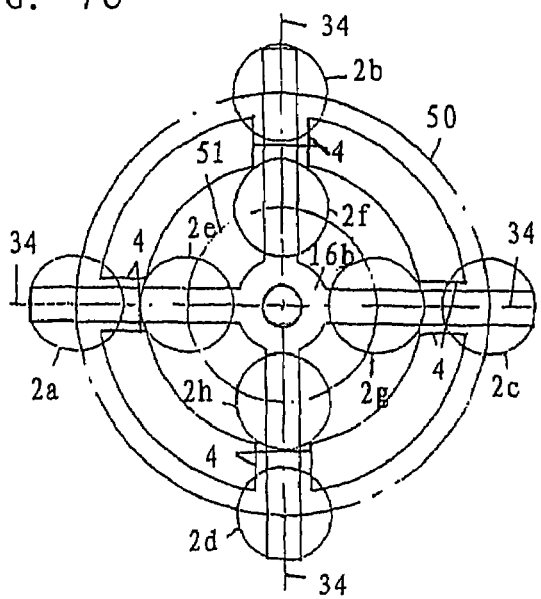
FIG. 7e is a schematically plan view illustrating eight cylinder openings 2 that are provided at the eight positions where two circumferences 50,51 intersect the quarter-sectors 34, the straight roller shaft 16 having four equally spaced segments and four fixed guide rails 4 located at positions which divides the circumference into four equal parts.
Figure 7F:
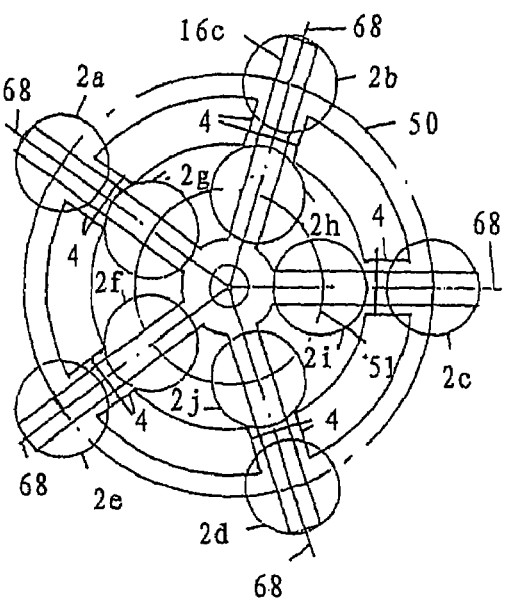
FIG. 7f is a schematically plan view illustrating ten cylinder openings 2 that are provided at the ten positions where two circumferences 50, 51 intersect the quinque-sectors 68, the straight roller shaft 16 having five equally spaced segments and five fixed guide rails 4 located at positions which divides the circumference into five equal parts.
Figure 8:
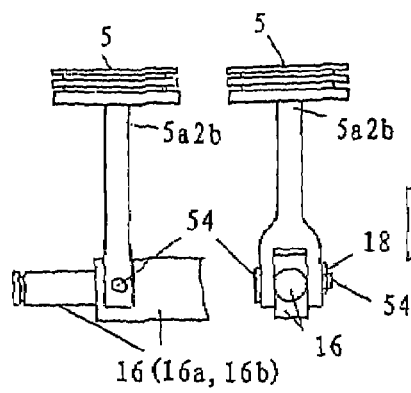
FIG. 8 is a view showing the assembly of the piston rod 5a2b having a "⊓"-shaped lower part and a roller shaft having side holes 17.

A six-cylinder and four-stroke internal combustion engine comprises a power transmission mechanism having an internal groove cam. The engine comprises an internal groove cam 6a, three cylinder covers 28 each of which has two combustion chambers, and on each of which a part of members forming the valve system, such as a valve and a camshaft and etc., are mounted, a cylinder 1 in which six cylinder openings 2 are disposed at the positions where two circumference 50, 51 intersect tri-sector 25, wherein 2a, 2b, 2c are located at the tri-sect positions on the same outer circumference and 2d, 2e, 2f are located at the tri-sect positions on another same inner circumference as shown in FIG. 7d, six pistons 5, six piston rods 5a, three primary rollers 9, three secondary rollers 38, three guiding rollers or sliding blocks 27, a three-leg roller shaft 16a, three fixed guide rails 4 extending axially and disposed at the tri-sect positions on the circumference, a cam box 15. The internal groove cam 6a is provided in the cam box 15. The cylinder 1 having six cylinder openings 2 and the three cylinder covers 28 at the upper part thereof is fixed to the cam box 15. The lower parts of the six piston rods 5a fixed to the six pistons 5 in the six cylinder openings 2 are equally mounted on three segments of the three-leg roller shaft 16a which is perpendicular to the piston rods, so that the six pistons 5 and the three-leg roller shaft 16a reciprocates in synchronism up and down as a unit. Three primary rollers 9 and three secondary rollers 37 are disposed near the outer ends of the three segments of the three-leg roller shaft 16b respectively at the positions corresponding to the circumferential cam contour so that they are received in the groove of the internal groove cam through three slots 12 in the upper circumferential cam contour of the internal groove cam 6 to roll following the circumferential contour, which forms a non-cantilevered structure freely supported at three ends. Three guiding rollers or slide blocks 27 are further disposed on the three-leg roller shaft at corresponding positions to the fixed guide rails 4 connected with the lower end of the cylinder 1 and extending in the axial direction of the internal groove cam so as to roll or slide up and down along the fixed guide rails 4.

The bevels gears 40 that are disposed respectively at one end of each of the three camshaft for valve systems 35 on the above three cylinder covers 28 all engage with the bevel gear 47 that is disposed at the upper end of the transmission shaft 48 for valve system, which extends upwardly from the central hole 14 on the upper end of the internal groove cam via the through hole 55 at center of the roller shaft, in order to make each of the three camshaft for valve systems 35 to rotate for three rounds when the internal groove cam 6a rotates for two rounds.

The cams for charging and exhausting air of the camshafts 35 for valve systems corresponding to the above three cylinders 2a, 2b, 2c on the outer circumference are designed to have the same magnitude and direction for the opening or closing angle, so that the three cylinders intake, compress, work and exhaust in synchronism, while cams for charging and exhausting air of the camshafts 35 for valve systems corresponding to the above three cylinders 2d, 2e, 2f on the inner circumference are designed to have the same magnitude and direction for the opening or closing angle, so that the other three cylinders intake, compress, work and exhaust in synchronism. It is designed to have a difference of 180 degrees between the phase of cams for charging and exhausting air of the camshafts 35 for valve systems for the above three cylinders 2a, 2b, 2c and the phase of cams for charging and exhausting air of the camshafts 35 for valve systems for the other three cylinders so that three cylinders on the same circumference are in compression stroke while the other three cylinders are in exhaust stroke when the six cylinders are all moving upward, and three cylinders on the same circumference are in power stroke while the other three cylinders are in intake stroke when the six cylinders are all moving downward. Therefore, all the six cylinders work three times when the above internal groove cam 6a rotates for two rounds, that is, eighteen times in total. It is apparent that efficiency of the cylinder and work per liter in the internal combustion engine are improved three times.

Embodiment 7

An eight-cylinder and four-stroke internal combustion engine comprises a power transmission mechanism having an internal groove cam 6b. The engine comprises an internal groove cam 6b with a cam groove having four peaks and four valleys, four cylinder covers 28 on each of which a part of members forming the valve system, such as a valve and a camshaft and etc., are mounted, a cylinder 1 having eight cylinder openings 2 disposed at the positions where two circumferences 50, 51 intersect the quarter-sector 34 as shown in FIG. 7b, eight pistons 5, eight piston rods 5a, four primary rollers 9, four secondary rollers 37, four guiding rollers or sliding blocks 27, a four-leg roller shaft 16b, four fixed guide rails 4 axially disposed at the quarter-sect positions on the circumference, a cam box 15. The internal groove cam 6b is provided in the cam box 15. The cylinder 1 having eight cylinder openings 2 and four cylinder covers 28 at the upper part thereof is fixed to the cam box 15. The lower parts of the eight piston rods 5a fixed to the eight pistons 5 in the eight cylinders 2 are equally mounted on four segments 16b1 of the four-leg roller shaft 16b which is perpendicular to the piston rods, so that the eight pistons 5 and the four-leg roller shaft 16b reciprocates up and down in synchronism as a unit. Four primary rollers 9 and four secondary rollers 37 are disposed near the outer ends of the four segments of the four-leg roller shaft 16b respectively at the positions corresponding to the circumferential cam contour so that they are received in the groove of the internal groove cam through four slots 12 in the upper circumferential cam contour of the internal groove cam 6 to roll following the circumferential contour, which forms a non-cantilevered structure freely supported at four ends. Four guiding rollers or slide blocks 27 are further disposed on the four-leg roller shaft at corresponding positions to the fixed guide rails 4 connected with the lower end of the cylinder 1 and extending in the axial direction of the internal groove cam so as to roll or slide up and down along the fixed guide rails 4.

The cams for charging and exhausting air of the camshafts 35 for valve systems corresponding to the above four cylinders 2a, 2b, 2c and 2d on the outer circumference may be designed to have the same magnitude and direction for the opening or closing angle, so that the four cylinders intake, compress, work and exhaust in synchronism, while cams for charging and exhausting air of the camshafts 35 for valve systems corresponding to the above four cylinders 2e, 2f, 2g, 2h on the inner circumference may be designed to have the same magnitude and direction for the opening or closing angle, so that the other four cylinders intake, compress, work and exhaust in synchronism. It is designed to have a difference of 180 degrees between the phase of cams for charging and exhausting air of the camshafts 35 for valve systems for the above four cylinders 2a, 2b, 2c, 2d and the phase of cams for charging and exhausting air of the camshafts 35 for valve systems for the other four cylinders 2e, 2f, 2g, 2h so that four cylinders on the same circumference are in compression stroke while the other four cylinders are in exhaust stroke when the eight cylinders are all moving upward, and four cylinders on the same circumference are in power stroke while the other four cylinders are in intake stroke when the eight cylinders are all moving downward.

Further, the cams for charging and exhausting air of the camshafts 35 for valve systems corresponding to two cylinders 2a and 2c on the outer circumference 50 and two cylinders 2e and 2g or 2f and 2h on the inner circumference 51 may be designed to have the same magnitude and direction for the opening or closing angle, so that the four cylinders intake, compress, work and exhaust in synchronism, while cams for charging and exhausting air of the camshafts 35 for valve systems corresponding to the other two cylinders 2b and 2d on the outer circumference 50 and the other two cylinders 2f and 2h or 2e and 2g on the inner circumference 51 may be designed to have the same magnitude and direction for the opening or closing angle, so that the other four cylinders intake, compress, work and exhaust in synchronism. It is designed to have a difference of 180 degrees between the phase of cams for charging and exhausting air of the camshafts 35 for valve systems for the former four cylinders and the phase of cams for charging and exhausting air of the camshafts 35 for valve systems for the latter four cylinders so that four cylinders are in compression stroke while the other four cylinders are in exhaust stroke when the eight cylinders are all moving upward, and four cylinders are in power stroke while the other four cylinders are in intake stroke when the eight cylinders are all moving downward.

In the Embodiment 5 and 7, bevel gears 40 that are disposed at one end of each of the four camshaft 35 for valve systems of the above four cylinder covers 28 all engage with the bevel gear 47 that is disposed at the upper end of the transmission shaft 48 which extends upwardly from the center of the upper end of the internal groove cam 6b via the through hole 55 at the center of the four-leg roller shaft 16b. The pistons reciprocate eight times when the internal groove cam 6b with a cam groove having four peaks and four valleys rotates for one round, and at the same time, each cylinder works twice, that is, an internal combustion engine having four cylinders works eight times, or an internal combustion engine having eight cylinders works sixteen times. It is apparent that efficiency of the cylinder and power per liter in an internal combustion engine using present invention are improved four times.

In the above Embodiment 3 to 7, it can be seen that there is a difference of 180 degree between the phase angle of the cams for charging and exhausting air with the same opening or closing angle of the valves corresponding to one half of the total cylinders and that of the cams for charging and exhausting air with the same opening or closing angle of the valves corresponding to the other half of the total cylinders, so that one half of the total cylinders are in power stroke while the other half of the total cylinders are in intake stroke when all pistons are moving downward, and one half of the total cylinders are in exhaust strokes while the other half of the total cylinders are in compression stroke when all pistons are moving upward.

In the above Embodiment 2 to 7, the cylinder covers 28 of the internal combustion engine have intake pipes connected at the intake ports, and exhaust pipes and muffles connected at the exhaust ports.

Figure 17:
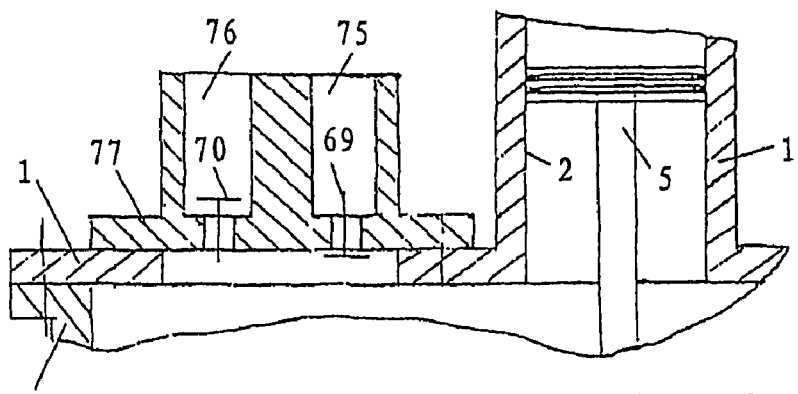
FIG. 17 is a partially section view illustrating a one-way valve seat 77 on the cylinder 1.
Figure 17A:
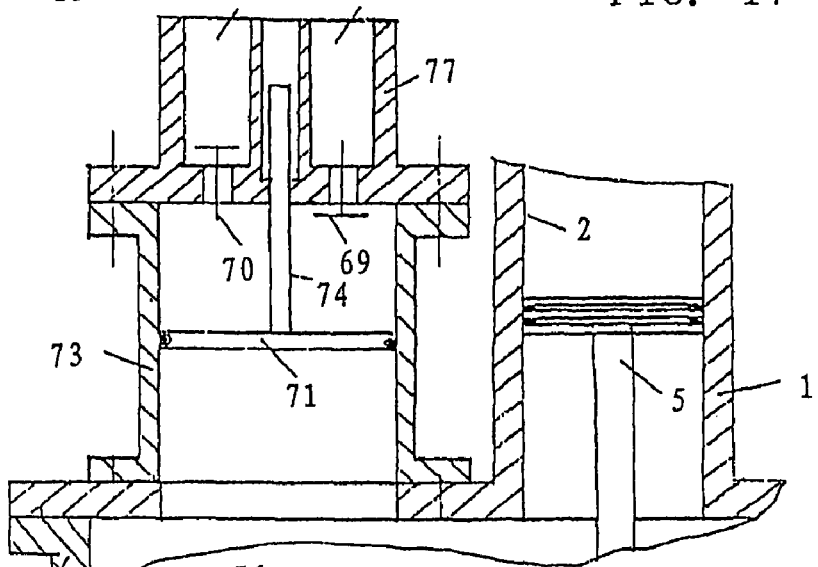
FIG. 17a is a partially section view illustrating a reciprocating booster pump mounted on the cylinder 1 which communicates with the cam box.
Figure 17B:
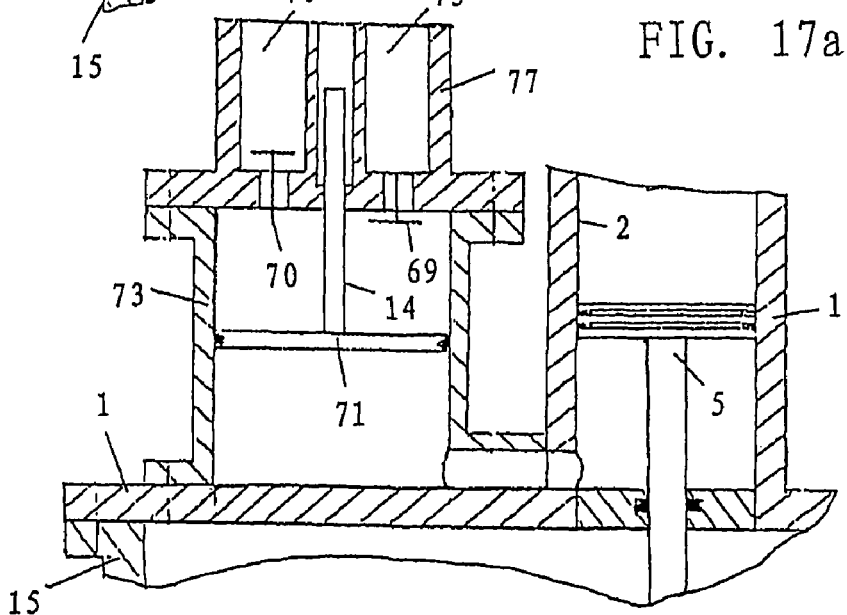
FIG. 17b is a section view illustrating a reciprocating booster pump mounted on the cylinder 1 which dose not communicate with the cam box.

One of the important ways to improve the power of the engine is to increase the amount of intake air. Although it is usual to utilize a turbocharger in a modern internal combustion engine for increasing air pressure, the cost is high. When the piston rods of the internal combustion engine according to the present invention reciprocate up and down, the volume under the piston varies and the air pressure changes accordingly. Thus, the cylinder will function as a pump only if it is provided with a one-way intake valve and a one-way exhaust valve so that the amount of intake air will increase. Therefore, a one-way intake valve 69 and a port 75 of the intake pipe communicating with the air, and a one-way exhaust valve 70 and a port 76 of the exhaust pipe communicating with the air are provided in the side hole 45 in the cylinder 1 or the cam box 15, as shown in FIG. 17. When the piston rods 5 move upward, vacuum is generated in the sealed cavity under the piston so that air is charged from the intake valve 69. When the piston rods 5 move downward, the air under the piston is pressurized into the cylinder through the exhaust valve 70. The air pressure changes in the sealed cavity under the piston rods also may be used as a power source to drive a free piston 71 or a membrane of an air driven reciprocating pump 73 having a free piston or a membrane in the side hole 45 in the cylinder and the cam box. Then air is pressurized into the cylinder through the one-way intake valve 69 on the one-way valve cover 77, then through the one-way exhaust valve 70 and an pipe directing to the intake port of the cylinder cover 28, as shown in FIGS. 17*a* and 17*b*, so that the efficiency of air pumping is improved as the cost is lowered.

The internal combustion engine as described in the above Embodiments 1 to 7 is such an gasoline internal combustion engine which is equipped with a gasoline pump, a carburetor or a gasoline supply system having an electronic controlled injection nozzle in the intake manifold and the like, and an ignition system having spark plugs, spark wires and jump-spark coils on the cylinder cover, or such an diesel internal combustion engine which is equipped with a high pressure injection pump, and an fuel supply system having high pressure injection nozzle.

The internal combustion engine as described in Embodiments 1 to 7 is provided with a ring gear at the lower part of the outer circumference of the internal groove cam and a starter motor at the position opposite to the cam box 15 in order to start the internal combustion engine.

The internal combustion engine as described in Embodiment 1 to 7 may be cooled by air, or water by a water pump, a water tank or a fan mounted therein.

Embodiment 8

Figure 18A:
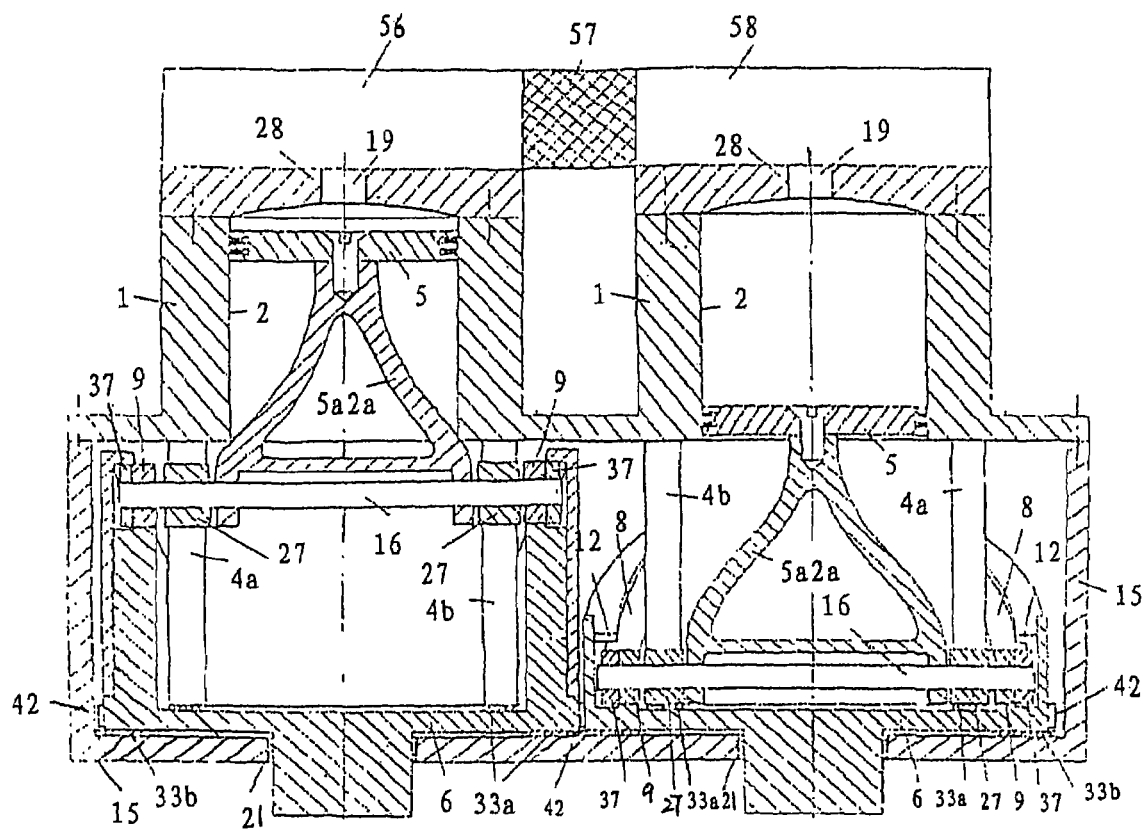
FIG. 18a is a front cross section view illustrating a sterling engine having two sets of power transmission mechanism having the internal groove cam in single cylinder.
Figure 18B:
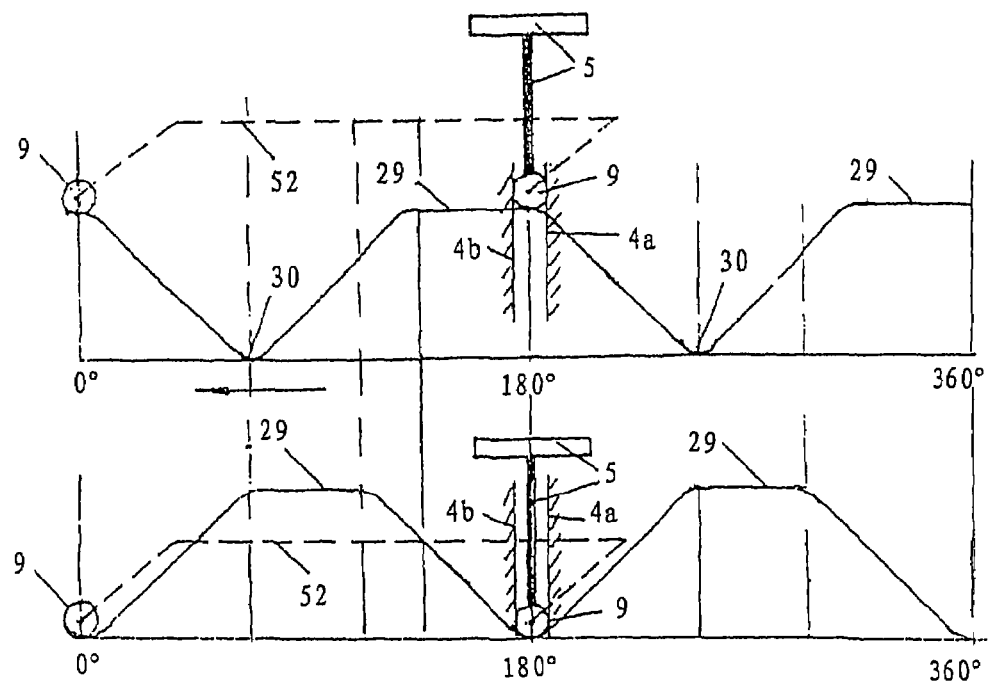
FIG. 18b is a graph illustrating the phase of the primary rollers 9 on the stretched lower circumferential cam contour 8, which are provided in the power transmission mechanism having the internal groove cam in the power cylinder of air distributions cylinder respectively of the sterling engine.

A sterling engine comprises a power transmission mechanism having an internal groove cam as shown in FIG. 18*a*. The engine comprises two sets of power transmission mechanism having an internal groove cam in a single cylinder, a heater 56, a recuperator 57, and a cooler 58. The two internal groove cams 6 in the two sets of power transmission mechanism having an internal groove cam in a single cylinder engage with each other by means of a gear 42 in parallel manner so as to transmit power. An air port 19 on one of the cylinder covers 28 communicates with the heater 56, and an air port 19 on the other cylinder cover 28 communicates with the cooler 58. The heater 56 and the cooler 58 both communicate with the recuperator 57 as shown in the FIG. 21. FIG. 18*b* shows the circumferentially stretched phase of the two primary rollers 9 disposed near both ends of the roller shafts connected with the lower part of the two piston rods 5*a*2*a* in the two sets of power transmission mechanism having an internal groove cam in a single cylinder, and rolling on the lower circumferential cam contour 8 of the internal groove cam 6. As shown in FIG. 6*b*1, when using the internal groove cam 6 having a circumferential cam contour with two upper stopping peaks and two valleys, a two-leg piston rod 5*b*2*a* and a roller shaft 16 are used. As shown in FIG. 6*a*, when using the internal groove cam 6 having a circumferential cam contour with three upper stopping peaks and three valleys, a three-leg piston rod 5*b*3 and a roller shaft 16*a* are used. As shown in FIG. 6*c*, when using the internal groove cam 6 having a circumferential cam contour with four upper stopping peaks and four valleys, a four-leg piston rod 5*b*2*a* and a roller shaft 16*b* are used. More than two sets of the power transmission mechanism having an internal groove cam may be used to constitute a multi-cylinder sterling engine by means of gear transmission.

Embodiment 9

Figure 19A:
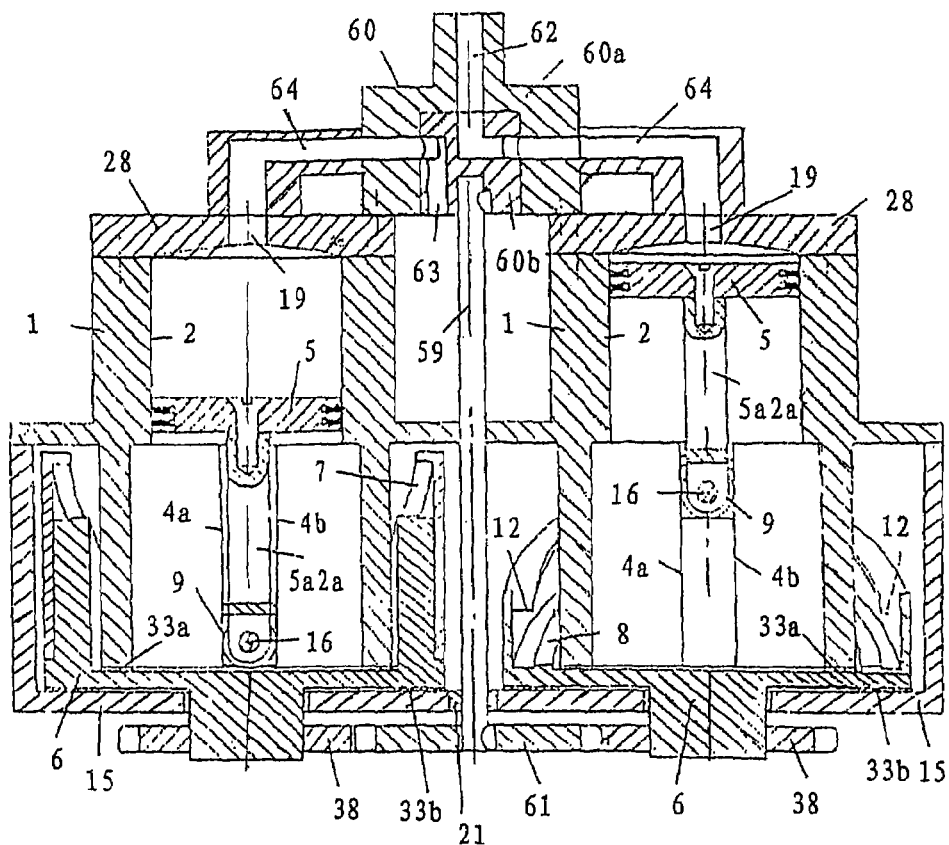
FIG. 19a is a section view illustrating a pneumatic or hydraulic motor having two sets of power transmission mechanism having the internal groove cam in single cylinder.
Figure 19B:
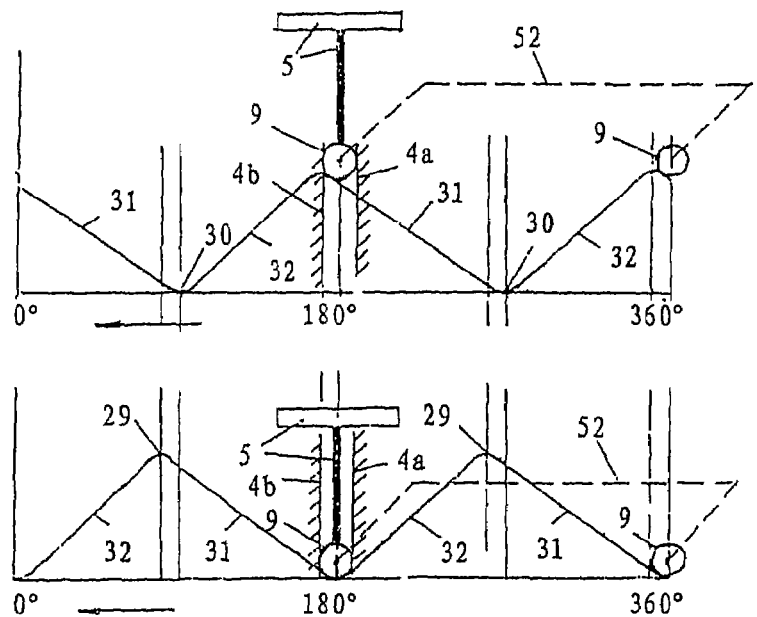
FIG. 19b is a graph illustrating the phase of the primary rollers 9 on the stretched lower circumferential cam contour 8, which are provided near each end of the roller shaft respectively in the power transmission mechanism having two sets of internal groove cam in single cylinder in the pneumatic or hydraulic motor.

A pneumatic or hydraulic motor comprises a power transmission mechanism having an internal groove cam. The motor comprises two sets of power transmission mechanism having an internal groove cam in a single cylinder, a transmission gear 38, a reversing gear 66, a reversing valve 60, a transmission shaft 59. The transmission gears 38 respectively mounted in the two sets of power transmission mechanism engage the intermediate reversing gear 66 in parallel manner to transmit power, wherein the intermediate gear 66 includes one end as the output shaft of the pneumatic motor, and the other end which links the reversing valve 60 located on the cylinder cover by means of the transmission shaft 59. Air channels 64 communicating with the reversing valve 60 are connected to the air ports 19 of the two cylinders 28 as shown in FIG. 19*a*. FIG. 19*b* shows the circumferentially stretched phase of the two primary rollers 9 near two ends of the roller shaft located at the lower part of the two piston rods 5 in the two sets of the power transmission mechanism having an internal groove cam in a single cylinder, in which the rollers roll on the lower circumferential cam contour 8 of the internal groove cam 6.

The above two internal groove cams both have the same two peaks and two valleys, or three peaks and three valleys, or four peaks and four valleys, and the projecting circumferential angle of the power curve 31 of the circumferential cam contour is greater than that of the exhaust curve 32 of the circumferential cam contour, so that once certain amount of working medium enters into from the intake port, the pneumatic or hydraulic motor will output torque power without dead point. More than two sets of the power transmission mechanism may be used to constitute a multi-cylinder pneumatic or hydraulic motor by means of gear transmission.

The maximum pressure angle in the rising curve 31 and descending curve 32 of the circumferential cam contour of the internal groove cam in the above embodiments may be designed to range from 40 to 80 degree, and is located at approximately the middle of the paths.

Embodiment 10

Figure 20:
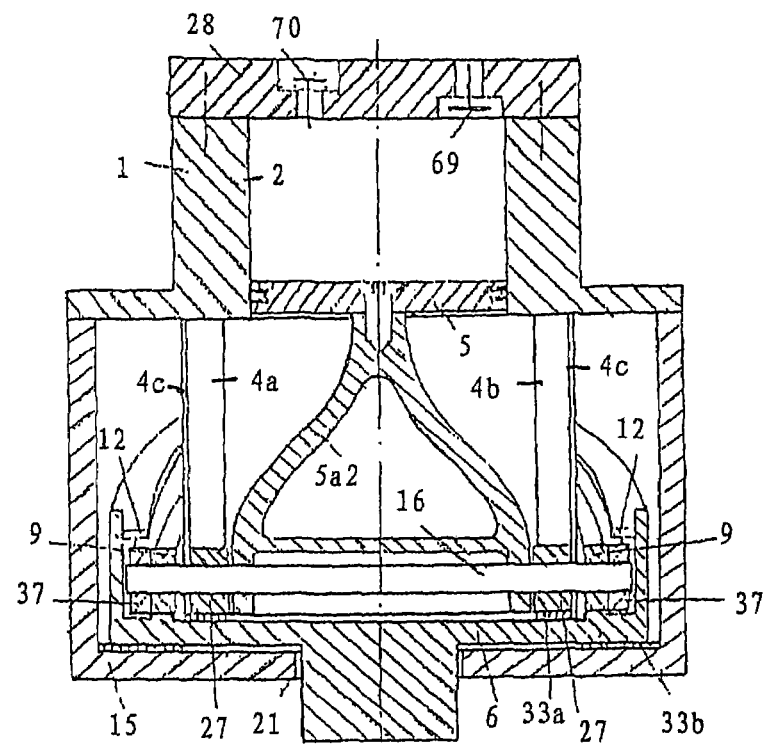
FIG. 20 is a section view illustrating a pump having the power transmission mechanism having the internal groove cam in single cylinder.

A pneumatic or hydraulic pump comprises a power transmission mechanism for conversion between linear movements and rotary motions. The pump comprises an internal groove cam 6, a roller shaft 16, a piston 5, a piston rod 5a2a, primary rollers 9, secondary rollers 37, guiding rollers or sliding blocks 27, a cylinder cover 28 having an intake valve 69 and an exhaust valve 70, a cylinder 1 having a cylinder opening 2, fixed guide rails 4, and a cam box 15. The internal groove cam 6 is provided in the cam box 15. The cylinder 1 having the cylinder opening and the cylinder cover 28 is fixed to the cam box 15 above the upper part of the cam. The lower part of the piston rod 5a2a fixed to the piston 5 in the cylinder opening 2 is mounted on the roller shaft 16. Two primary rollers 9 and two secondary rollers 37 are disposed near the two ends of the roller shaft at the positions corresponding to the circumferential cam contour so that they are received in the groove of the internal groove cam through two slots 12 in the upper circumferential cam contour of the internal groove cam 6 to roll following the circumferential contour, which forms a non-cantilevered structure freely supported at two ends. Two guiding rollers or slide blocks 27 are further disposed on the roller shaft at corresponding positions to the fixed guide rails 4 connected with the lower end of the cylinder 1 in the axial direction of the internal groove, as shown in FIG. 20. The piston 5 will reciprocate up and down when external force drives the internal groove cam to rotate, so that the air or liquid in the cavity above the piston will be drawn in through the intake valve 69, and exhausted out through the exhaust valve 70.

Figure 10A:
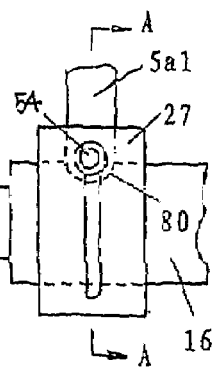
FIG. 10a is a partially cross section view illustrating the fixed guide rail seats 4d having a small nozzle hole 78 which aligns with the rolling bearing for the primary roller 9.
Figure 10A:
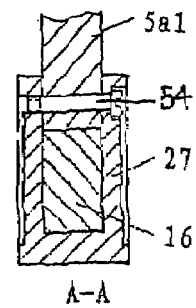
Figure 10A:
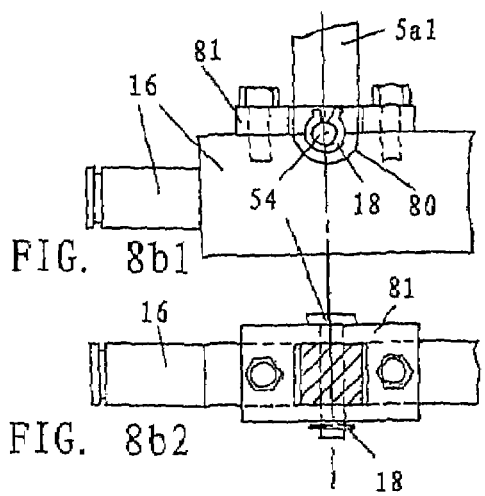
Figure 10A:
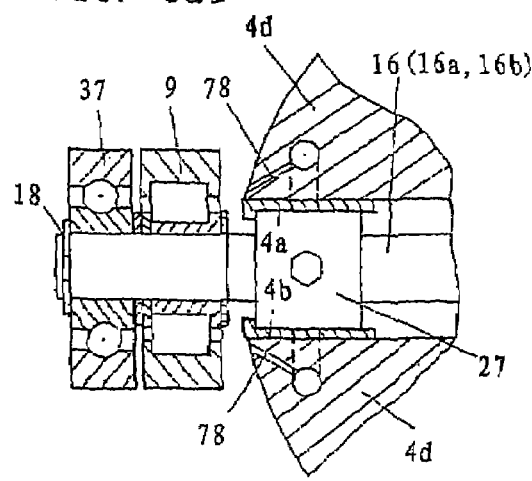
Figure 9:
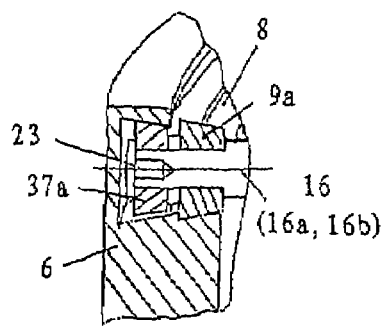
FIG. 9 is a partially cross section view illustrating that status when the primary and secondary rollers 9a and 37 having a taper shape are located in the inner circumferential groove formed by the inward-tipping upper circumferential cam contour 7 and lower circumferential cam contour 8 of the internal groove cam.
Figure 10B:
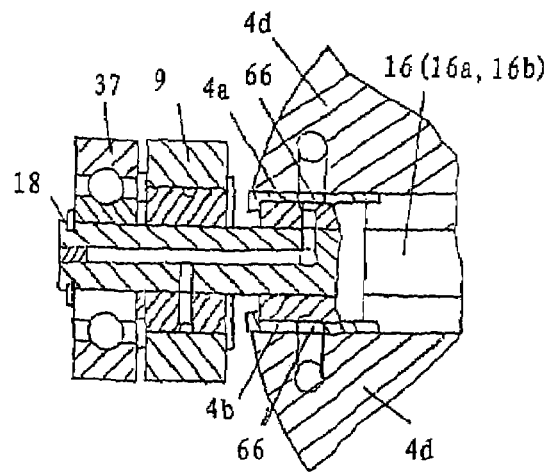
FIG. 10b is a partially cross section view illustrating the oil path which directs from the hole 66 on the guide rail surface 4a, 4b of the fixed guide rail 4 and the sliding block 27 to the primary roller 9 via a central hole in the roller shaft when the primary roller 9 is mounted with a plain bearing.

Sliding bearings (rolling bearings are not excluded) are disposed between the lower part of the internal groove cam and the end surface bearing, and between the sliding blocks and the fixed guide rails, so that they may be lower plane kinematical pair which has enough area in order to use pressurized lubricant oil as oil pad to support the internal groove cam and the sliding blocks for improving efficiency. A part of lubricant system and oil path are as follows: the pressurized oil is outputted from the oil pump 42 by the output shaft at the lower part of the internal groove cam to the lower end surface of the internal groove cam and a through hole 61, then pass ring channel 33a1 of the upper end surface bearing 33a and a through hole extending upward to a through hole 66 on the surface of the fixed guide rail 4, as shown in FIG. 3. Then, the sliding block 27 seal the hole 66. If rolling bearings are used for the primary roller 9 and the secondary roller 37, a small nozzle hole 78 is disposed on the side surface of the fixed guide rail seat 4d to communicate with the oil path, in order to enable the roller shaft to rise to about half the height, so that lubricant oil from the nozzle hole 78 sprays to the primary rollers 9 to lubricate and cool them, as shown in FIG. 10a. If sliding bearings are used for the primary rollers 9, the sliding surface of the sliding block 27 may be provide with a hole directing to the central hole of the roller shaft, and the roller shaft may be provided with a hole directing to the central hole of the roller shaft for lubricating and cooling the primary rollers 9, which is located at a position where the primary rollers 9 are installed, as shown in FIG. 10b.

When being installed near either outer end of the roller shaft, the primary rollers 9 and the secondary rollers 37 may be positioned by a snap ring 18. After the primary and secondary rollers are received in the groove of the internal groove cam through the slot 12 in the upper circumferential cam contour 7, an enclosing block 13 may be used to seal each of the slots 12 by a screw 23 when needed.

In the internal combustion engine, sterling engine, pneumatic or hydraulic motor having the power transmission mechanism having an internal groove cam as described above, there are an openable seal cover and a hole 55 communicating with outside provided in inner side of the cam box 15 at the position corresponding to the side hole 22 of the internal groove cam or the slot 12 for removing or installing the primary roller 9 and the secondary roller 37 from or to the roller shaft by exposing the hole 45, removing the seal block 13 and snap ring 18 without disassembling the cylinder.

An engine comprising the power transmission mechanism having an internal groove cam may be used in traveling vehicles (such as vehicle, ship, air craft and the like) used in the air, water or on the land, or power outputting machines to provide power.

What is claimed is:

1. A power transmission mechanism for conversion between linear movements and rotary motions, comprising:
    an internal groove cam capable of rotating about an axis thereof, comprising a continuous cam groove formed in the wall of a cylindrical inner cavity formed by the internal groove cam;
    a cam box accommodating and supporting the internal groove cam, which comprises a cover on the top thereof and a fixed rail mounted below the cover and extending into the cylindrical inner cavity formed by the internal groove cam;
    an assembly for linear reciprocating movement including:
        a roller shaft provided perpendicular to the axis of the internal groove cam,
        a primary roller and a secondary roller mounted adjacent to each other at each end of the roller shaft, both rollers mounted into the cam groove for rolling in the cam groove, and
        a guiding member provided on the roller shaft and moving along the rail, wherein the primary roller, the secondary roller and the roller shaft form a non-cantilevered structure freely supported at least at two ends thereof in the internal groove cam;
    wherein the primary roller and the secondary roller move in the cam groove, in conjunction with the simultaneous movement of the guiding member along the fixed rail, to actuate the movement of the roller shaft.

2. A power transmission mechanism for conversion between linear movements and rotary motions according to claim 1, wherein the guiding member is a roller or a sliding block.

3. A power transmission mechanism for conversion between linear movements and rotary motions according to claim 1, wherein the cover is provided by a cylinder having a cylinder opening, in which a piston having a piston rod is received, the piston rod of the piston being connected to the piston at one end and to the roller shaft at the other end.

4. A power transmission mechanism for conversion between linear movements and rotary motions according to claim 3, wherein one of the upper cam contour and the lower cam contour has at least two slots for receiving the roller shaft into the cam groove.

5. A power transmission mechanism for conversion between linear movements and rotary motions according to claim 3, wherein the roller shaft includes n segments irritating from the center to the periphery and spaced circumferentially at equal angle, and n fixed rails are formed corresponding to the n segments, n being an integer between 2 to 5.

6. A power transmission mechanism for conversion between linear movements and rotary motions according to claim 5, wherein the piston rod has n legs being connected to corresponding segments of the roller shaft respectively.

7. A power transmission mechanism for conversion between linear movements and rotary motions according to claim 5, wherein the piston has n piston rods being connected to the corresponding segments of the roller shaft respectively, and the cylinder has n cylinder openings.

8. A power transmission mechanism for conversion between linear movements and rotary motions according to claim 5, wherein n cylinders are provided to correspond to the segments of the roller shaft respectively, each of which has a piston, a piston rod and a cylinder opening, the piston rod being connected to the corresponding segment of the roller shaft.

9. A power transmission mechanism for conversion between linear movements and rotary motions according to claim 8, wherein the power transmission mechanism for conversion between linear movements and rotary motions comprises a single-cylinder and double-stroke internal combustion engine, in which n is 2.

10. A power transmission mechanism for conversion between linear movements and rotary motions according to claim 8, wherein the power transmission mechanism for conversion between linear movements and rotary motions comprises a single-cylinder and four-stroke internal combustion engine, in which n is 2.

11. A power transmission mechanism for conversion between linear movements and rotary motions according to claim 8, wherein the power transmission mechanism for conversion between linear movements and rotary motions comprises a four-cylinder and four-stroke internal combustion engine, in which n is 4.

12. A power transmission mechanism for conversion between linear movements and rotary motions according to claim 5, wherein said cylinder is provided with m cylinder openings for each segment of the roller shaft so that the amount of the cylinders opening is m×n in total, a piston and a piton rod being disposed to correspond to each cylinder opening, the piston rod being connected to the corresponding segment of the roller shaft and the m being 1 or 2.

13. A power transmission mechanism for conversion between linear movements and rotary motions according to claim 12, wherein the power transmission mechanism for conversion between linear movements and rotary motions comprises a double-cylinder and four-stroke inline internal combustion engine, in which n is 2 and m is 1.

14. A power transmission mechanism for conversion between linear movements and rotary motions according to claim 12, wherein the power transmission mechanism for conversion between linear movements and rotary motions comprises a four-cylinder and four-stroke inline internal combustion engine, in which n is 2 and m is 2.

15. A power transmission mechanism for conversion between linear movements and rotary motions according to claim 1, wherein the internal groove cam has a rotary shaft, and the cam groove has a contour curve having at least two peaks and two valleys with the same amplitude, and comprises an upper cam contour and a lower cam contour, the primary rollers and the secondary rollers rolling between them.

16. A power transmission mechanism for conversion between linear movements and rotary motions according to claim 15, wherein the internal groove cam is combined and fixed to each other by two parts which have the upper cam contour and the lower cam contour, respectively.

17. A power transmission mechanism for conversion between linear movements and rotary motions according to claim 15, wherein the downward projection image of the working contour of the upper cam contour does not overlap the working contour of the lower cam contour, or does not coincide completely therewith.

18. A power transmission mechanism for conversion between linear movements and rotary motions according to claim 15, wherein the secondary rollers contact and engage with the upper cam contour of the internal groove cam, and the primary rollers contact and engage with the lower cam contour of the internal groove cam.

19. A power transmission mechanism for conversion between linear movements and rotary motions according to claim 15, wherein the upper cam contour and/or the lower cam contour are inward-tipping with respect to the inner portion of the cam grooves.

20. A power transmission mechanism for conversion between linear movements and rotary motions according to claim 1, wherein the maximum pressure angle of the rising curve or the descending curve in the circumferential cam contour curve of the internal groove cam is designed to range from 40 to 80 degree.

* * * * *

UNITED STATES PATENT AND TRADEMARK OFFICE
CERTIFICATE OF CORRECTION

| | | |
|---|---|---|
| PATENT NO. | : 7,584,737 B2 | Page 1 of 1 |
| APPLICATION NO. | : 11/791412 | |
| DATED | : September 8, 2009 | |
| INVENTOR(S) | : Quan Zhao | |

It is certified that error appears in the above-identified patent and that said Letters Patent is hereby corrected as shown below:

On title page Item (75) should read:

(75) Inventor: Quan Zhao, Xiamen (CN)

Signed and Sealed this

Seventeenth Day of November, 2009

David J. Kappos
*Director of the United States Patent and Trademark Office*